United States Patent
Spedden

(10) Patent No.: US 7,226,291 B2
(45) Date of Patent: Jun. 5, 2007

(54) REFRESHABLE TACTILE COMPUTER DISPLAY

(75) Inventor: Janet A. Spedden, Clarksville, MD (US)

(73) Assignee: The Johns Hopkins University, Baltimore, MD (US)

( * ) Notice: Subject to any disclaimer, the term of this patent is extended or adjusted under 35 U.S.C. 154(b) by 658 days.

(21) Appl. No.: 10/470,897

(22) PCT Filed: Mar. 7, 2002

(86) PCT No.: PCT/US02/06943

§ 371 (c)(1),
(2), (4) Date: Nov. 26, 2003

(87) PCT Pub. No.: WO02/080134

PCT Pub. Date: Oct. 10, 2002

(65) Prior Publication Data

US 2005/0098044 A1    May 12, 2005

Related U.S. Application Data

(60) Provisional application No. 60/280,893, filed on Apr. 2, 2001.

(51) Int. Cl.
*G09B 21/00* (2006.01)

(52) U.S. Cl. .................... 434/114; 434/112; 340/407.1; 345/173; 345/31

(58) Field of Classification Search ........ 434/112–117, 434/307 R, 365; 340/407.1, 825.19; 345/31, 345/173; 715/702
See application file for complete search history.

(56) References Cited

U.S. PATENT DOCUMENTS

| 3,659,354 | A | | 5/1972 | Sutherland |
| 4,033,053 | A | * | 7/1977 | Engler ........................ 434/114 |
| 4,871,992 | A | * | 10/1989 | Petersen .................. 340/407.1 |
| 5,286,199 | A | * | 2/1994 | Kipke ........................ 434/114 |
| 5,466,154 | A | * | 11/1995 | Thompson .................. 434/114 |
| 5,580,251 | A | | 12/1996 | Gilkes et al. |
| 5,685,721 | A | | 11/1997 | Decker |

(Continued)

FOREIGN PATENT DOCUMENTS

AT    WO 92/15079    9/1992

(Continued)

OTHER PUBLICATIONS

"Three-Dimensional Tactile Display for the Blind, IEEE Transactions on Rehabilitation Engineering" vol. 6, No. 3, Sep. 1998, Masami Shinohara, et al., p. 249-255.

(Continued)

*Primary Examiner*—Joe H. Cheng
(74) *Attorney, Agent, or Firm*—Albert J. Fasulo, II

(57) ABSTRACT

A method and apparatus for refreshable tactile output of information from a computer, includes using a movement actuator to move in unison along a first dimension a plurality of tactile elements that can be touched by a user of the tactile output. Based on data received from a computer processor, a particular tactile element of the plurality of tactile elements is locked with a corresponding lock actuator of a corresponding plurality of lock actuators different from the movement actuator. The method and apparatus allow a low cost, highly reliable movement actuator to be employed that does not substantially exceed the size of the tactile output area.

40 Claims, 16 Drawing Sheets

U.S. PATENT DOCUMENTS

| | | | | |
|---|---|---|---|---|
| 6,109,922 | A | * | 8/2000 | Litschel et al. ............. 434/114 |
| 6,217,338 | B1 | * | 4/2001 | Tieman ...................... 434/114 |
| 6,417,821 | B1 | * | 7/2002 | Becker et al. ................ 345/31 |
| 6,445,284 | B1 | * | 9/2002 | Cruz-Hernandez et al. ...................... 340/407.1 |
| 6,636,202 | B2 | * | 10/2003 | Ishmael et al. ............. 345/173 |
| 6,705,868 | B1 | * | 3/2004 | Schleppenbach et al. ... 434/114 |

FOREIGN PATENT DOCUMENTS

| | | |
|---|---|---|
| DE | 39 23 967 A1 | 1/1991 |
| DE | 43 35 442 A1 | 4/1995 |
| JP | 11161153 | 6/1999 |

OTHER PUBLICATIONS

PCT International Search Report-PCT/US02/06943.

* cited by examiner

REFRESHABLE TACTILE COMPUTER DISPLAY

CROSS-REFERENCE TO RELATED APPLICATIONS

This application claims the benefit of provisional U.S. application No. 60/280893, filed on Apr. 2, 2001, the entire contents of which are hereby incorporated by reference as if fully disclosed herein.

BACKGROUND OF THE INVENTION

1. Field of the Invention

The present invention relates to tactile displays for computer systems that can be used to present Braille characters and other information with movable tactile elements that can be touched by a human user. In particular, the present invention relates to a refreshable tactile display using one actuator protected from touching forces for moving tactile elements and separate actuators to lock the tactile elements in place.

2. Description of the Related Art

To make computer systems accessible to visually impaired users, a tactile display with multiple tactile elements that can be touched by a user serves many purposes. A tactile display with two positions for the tactile elements (raised and lowered) can be used to form Braille characters that can be scanned by a trained user more rapidly than a speech synthesizer can pronounce the same material. A tactile display with contiguous tactile elements that each can assume one of two positions can form raised ridges against a recessed background that can be used to present lines, curves and blocked areas of black and white graphics. A tactile display with contiguous tactile elements that can each assume multiple vertical positions can form variably raised ridges that can be used to present topographic information, such as the contours of a face or a relief map of a portion of the earth's surface.

Typically, the tactical elements are cylindrical pins that can be moved by actuators up or down in the dimension defined by a long axis of the pins. The properties of tactile displays are controlled by the properties of actuators that can convert electric signals controlled by a computer processor to mechanical movement of tactile elements sufficient to be felt a human user.

Experience with Braille displays shows a human can feel a pin displacement of 0.010 inches when the human applies a force of 20 grams to the pin, so this force should be opposed by the display; and the human can feel a pin displacement of 0.020 to 0.030 inches without an opposing force, such as if the pin moves under the human's touch. The specifications for Braille characters and common extensions to Braille specifications, define characters that each are made of up to eight dots in two columns of up to four dots, include dots with a height difference (z-dimension) of about 0.019 inches, in. (0.48 millimeters, mm), a dot diameter of about 0.057 in. (1.45 mm), a spacing between dot centers in the same character of about 0.092 in. (2.34 mm), and a separation between corresponding positions on adjacent Braille characters of about 0.245 in. (6.22 mm) for adjacent characters on the same line (x-dimension) and, for six dot Braille characters, about 0.400 inches (10.16 mm) for adjacent characters on different lines (y-dimension). Typical embossed paper Braille displays, which are not refreshable, present 25 lines of 40 six-dot Braille characters that are found acceptable presentations for scanning.

Using conventional commercial refreshable Braille displays, 25 lines of 40 characters are not achieved. Instead, a single line with up to 80 characters, but more typically only 40 characters, is commercially available. For example the Power Braille 80 Display by Blazie Engineering, and available from Freedom Scientific, presents a single line of 80 eight-dot Braille characters on a relatively large flat rectangular box; the unit is 24 inches long (x-dimension), 11.5 inches wide (y-dimension), 1.5 inches thick (z-dimension), weighs about ten pounds, and retails for about $10,000. A 40-character display from the same company is about half as long (only 14 inches), half as heavy (about five pounds) and costs about half, but is about the same width (13 inches) and thickness (1.5 inches) as the 80-character display.

The actuators used by many commercial systems, including the Power Braille 40 and Power Braille 80, employ piezoelectric bending elements. These actuators are favored because they are simpler to manufacture, more reliable in use, and consume less power than arrays of tiny electromagnetic coils acting on magnetized pins; however, these actuators require considerably more space than electromagnetic coils. A piezoelectric material changes shape when subjected to a large electric field. Piezoelectric bending elements curl when subjected to a strong electric field, but the deflection at the end of a beam of such material is a small percentage (often less than 1%) of the length of the beam. To achieve a deflection of 0.02 inches, on the order of a Braille dot height, from a material with a 0.2% deflection in an electric field, a beam about 10 inches long is utilized. This provides an important reason for the great width (11.5 to 13 inches) of the Power Braille displays. In alternative configurations, small mechanical levers can be used to amplify small deflections, but such approaches increase the complexity and cost of such devices.

A simple approach is to use an array of small electromagnetic coils with magnetized cores to displace the pins that serve as tactile elements. Sizes useful for multi-line displays are not achieved unless the size of each electromagnet is about one sixth the area allotted for each six-dot Braille character on a page (or one eighth the area allotted for each eight-dot extended Braille character).

This approach suffers from several disadvantages. One disadvantage is that such tiny electromagnets are expensive to manufacture and assemble in arrays, are unreliable, and are difficult to replace in the tight arrays needed for Braille characters.

Another disadvantage is that such electromagnets consume substantial power to move a pin a Braille character height and sustain the pin in the moved position against the forces applied by a human reader. For example, it is assumed that an electromagnet consumes 100 milliWatts to move and sustain a pin in a non-rest state (either raised or lowered). A display having 25 lines of 40 eight-dot characters includes 8000 pins, and would consume 800 Watts to move all the pins. A graphical or topographical display would have many more pins in the same area and consume considerably more power. For example, each six-dot Braille character is allotted an area about 0.4 inches by 0.25 inches in which there would be 40 contiguous pins of diameter 0.05 inches. This is five times the number of pins used in the example Braille display, and results in a power consumption of 4000 Watts. A typical residential electrical outlet supplies only about 1200 Watts. Thus an array of small electromagnets can exceed the power capacity of a residential electric outlet for graphical or topographical displays.

Another disadvantage is that electromagnets small enough to generate Braille characters are still not small enough to represent graphic and topographic information, in which pins about the size of Braille dots are contiguous. The electromagnet diameter would be constrained to be about 0.05 to 0.06 inches in diameter.

In another approach, the electromagnets are used to raise the pins, but the pins are then locked in place so that the electromagnets do not have to expend power to maintain a pin in a non-rest position. Such an approach reduces the power problems in Braille and graphical or topographical displays. However, the complexity and cost of the display is increased by the extra components required for the locking mechanism in addition to the cost and complexity of the tiny electromagnets.

Another approach forms Braille characters on a rotating rim of a fixed wheel. For each dot of the three or fours dots on each column of a Braille character, two inverted "T" shaped grooves are cut in the wheel at different radii from the axis of rotation, separated by the Braille dot height distance. Flanges are added to the pins used as tactile elements to hold the pins in place in one of the two grooves. An electromagnetic coil moves a magnetized rod at a non-rotating position on the wheel and moves pins to engage one of the grooves. If the flange on the pin engages the outer groove, the pin is extended beyond the rim; if the flange engages the inner groove, the pin is recessed in the rim. Holes in the rotating rim drag both extended and recessed pins one circuit around the wheel in the grooves. When the pins return to the fixed position of the electromagnetic coils, the pins are reset to one of the two groves for the Braille characters on the next line. A reader positioned away from the electromagnetic coils reads the Braille characters as they rotate with the rim past the reader.

A disadvantage of this approach is the great thickness of a display device that accommodates the diameter of the wheel. Another disadvantage is that a reader cannot skim several lines during the time of a single rotation by the rim. Another disadvantage is that the approach is not suitable for displaying graphical information, which would employ many more than the one row provided by this approach. Another disadvantage is that the approach is not suitable for displaying topographical information, which would employ many more than the two radial positions allowed by the two grooves for the tactile elements.

A smaller, lighter mechanism to generate each character would allow multiple-line Braille displays favored for scanning by human users. A mechanism to generate each character that is less complex and less costly to manufacture would allow affordable prices that foster more widespread use. In addition, smaller and lighter mechanism would allow better tactile graphic and topographic displays.

Based on the foregoing, there is a clear need for a smaller, less complex mechanism for generating Braille characters in a refreshable display for computers.

In addition, there is a clear need for a smaller, less complex refreshable tactile display that represents graphical or topographical information.

In addition, there is a need for a smaller, less complex mechanism for a refreshable tactile display that can represent Braille characters and also can represent graphical information or topographical information or both.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

Techniques are provided for refreshable tactile output of information from a computer. In one aspect of the invention, a method includes using one movement actuator to move in unison along a first dimension multiple tactile elements, such as pins, that can be touched by a user of the tactile output. Based on data received from a computer processor, a particular tactile element is locked with a corresponding lock actuator. The corresponding lock actuator is one among multiple lock actuators that correspond to the multiple tactile elements. The lock actuators are different from the movement actuator.

In another aspect of the invention, a method includes using a movement actuator to move a tactile element of multiple tactile elements along a first dimension absent a force applied by a user of the tactile output based on data received from a computer processor all the tactile elements are locked with a lock actuator that is different from the movement actuator. After locking the tactile elements, all the tactile elements withstand a force applied by the user.

In another aspect of the invention, an apparatus includes multiple tactile elements moveably mounted in a frame. The tactile elements can be touched by a user of the tactile output. A single movement actuator is included for moving the multiple tactile elements in unison relative to the frame along a first dimension. Multiple lock actuators different from the movement actuator correspond to the multiple tactile elements. Each lock actuator is included for locking relative to the frame a corresponding tactile element based on data received from a computer processor.

In another aspect of the invention, an apparatus includes multiple tactile elements moveably mounted in a frame. A movement actuator is included for moving one tactile element relative to the frame along a first dimension absent a force applied by the user. A lock actuator different from the movement actuator is included for locking relative to the frame all the tactile elements.

By separating the functions of the movement actuator and a lock actuator, a single movement actuator may be used to reposition all unlocked tactile elements in a display or a subsection of the display. Eliminating an array of movement actuators can reduce complexity, and can increase reliability. In addition, there is no longer a tight size restriction on the size of the movement actuator imposed by the size and spacing of the pins often used as tactile elements. The removal of a tight size restriction is an advantage in a component that does the most work, such as the movement actuator. Although a tight size restriction remains on the locking actuators, the locking actuators can be designed to do considerably less work than the movement actuators, and the size restriction can become a significantly smaller obstacle for providing a lock actuator.

Other aspects of the invention use individual movement actuators, but isolate the movement actuators from the forces of a human touch, and use a single locking mechanism. This approach has the advantage that the space around each pin is used for only one individualized actuator, the movement actuator. A single locking actuator that locks all pins simultaneously can be larger and less complex.

These techniques allow a low cost, highly reliable movement actuator to be employed that does not substantially exceed the size of the tactile output area.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a refreshable tactile computer display is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments of the invention apply to forming Braille characters, tactile graphics, and topographic information and any combination of the three types of information. To simplify the description of the invention, a first embodiment that may be applied to all three kinds of information is described in a first section. To further describe the invention in detail, several specific examples with additional details are also provided in subsequent sections.

1. Refreshable Topographic Tactile Display Structural Elements

Figure 1A:
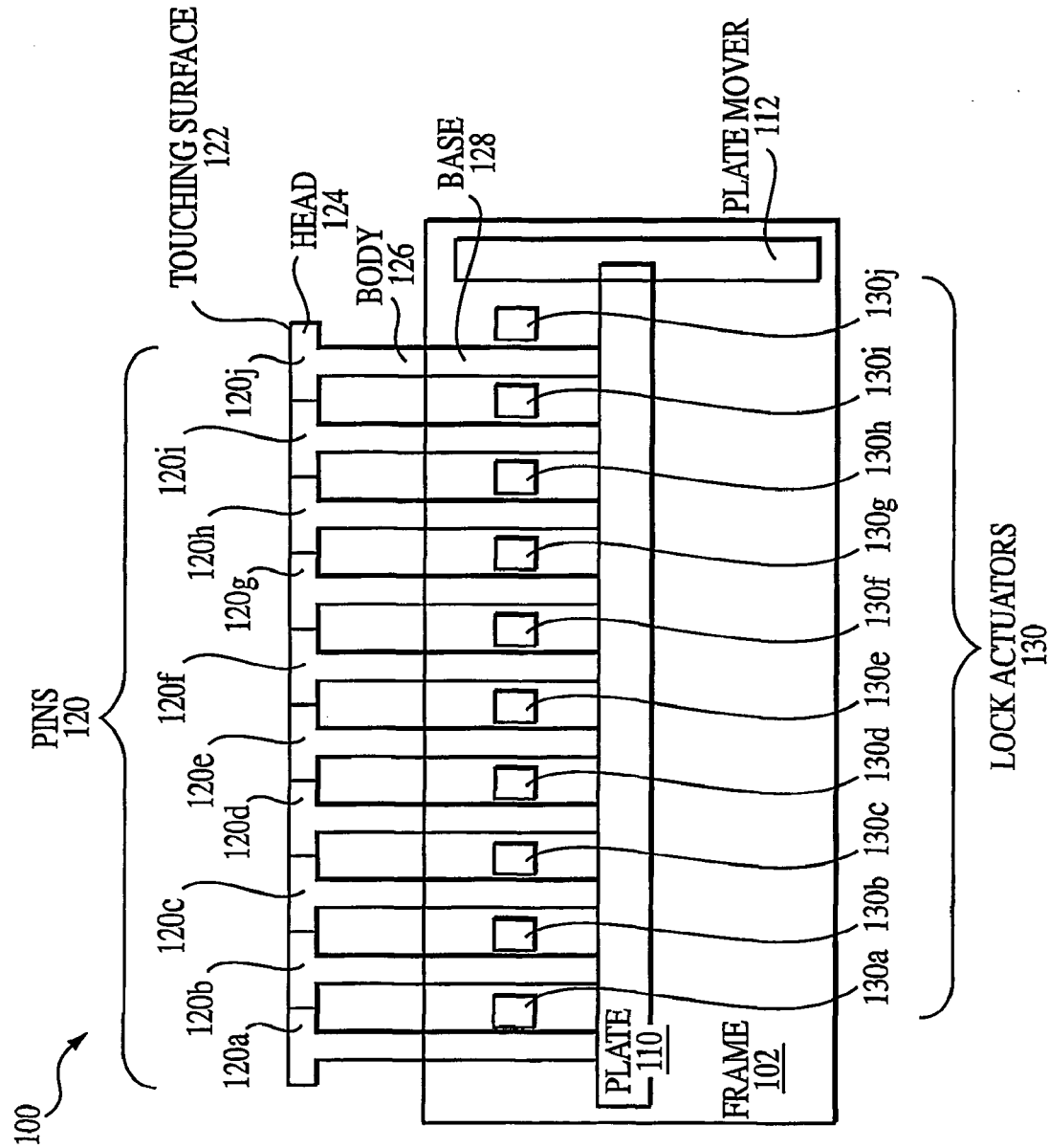
FIG. 1A is a block diagram illustrating a tactile output device with tactile elements in an extended position, according to an embodiment.

FIG. 1A is a block diagram illustrating a tactile output device with tactile elements in an extended position, according to an embodiment of a refreshable topographic tactile display 100. Neither the block diagram of FIG. 1A nor any other block diagram is drawn to scale. The display 100 includes one or more frames 102 in which are mounted rigid pins 120, which are used as tactile elements that can be touched by a user of the tactile display. In other embodiments, other elements, such as rigid spheres or other shapes, may be used as tactile elements.

Any number of pins greater than one may be used. For purposes of illustration it is assumed that the frame 102 includes one hundred twenty six (126) pins 120 arranged in an array having nine columns, each column with fourteen pins. A frame of this size can form one Braille cell with approximately the proper spacing between Braille rows and columns, as described in more detail below. Such a cell has an area of about 66.2 mm$^2$. A display of a desired size can then be fabricated by assembling an array of such frames together. For example a display having twenty-five lines of 40-Braille character rows would be made up of one thousand such frames. An advantage of such a small frame is that a mechanical failure in a frame can be repaired by removing the faulty frame and replacing it with a new frame. Another advantage of such a small frame is that any type of display for any application, from a few characters, to one line, to a whole page can be constructed simply by assembling a different array of such frames. In some embodiments, the frame 120 may comprise all 126,000 pins of an entire twenty-five line, 40-character Braille display in an array with 360 columns and with 350 pins per column.

FIG. 1A shows some pins from one column of one frame 102 of the display 100, including pins 120*a*, 120*b*, 120*c*, 120*d*, 120*e*, 120*f*, 120*g*, 120*h*, 120*i*, 120*j*. Other pins on the column and pins in other columns are not show in FIG. 1. Each pin 120 has a base at an end of the pin inside the frame 120, a long body, and a head at an end of the pin outside the frame 120. For example, pin 120*j* includes a base 128, a body 126 and a head 124. A surface of the head of the pin that may be touched by a user of the tactile display is called hereinafter a "touching surface." For example, pin 120*j* has touching surface 122.

The head, body and base of the pin may have different sizes or the same sizes. For example, in FIG. 1A pins 120 have the same size base and body but a larger size head. The head, body and base may have the same or different cross section shapes in a plane perpendicular to the long axis of the pin. For purposes of illustration, it is assumed that the cross sections of the base and body are circles and the cross section of the head is a square with rounded corners. The assumed size and shape of the heads of the pins gives the pins a smooth and continuous feel when a user touches the touching surface of the pins. Details for sample embodiments of pins are provided in the examples described in subsequent sections.

The pins 120 are mounted in the frame 102 to move in a dimension aligned with the long axis of the pins. Any manner known in the art can be used to mount the pins in the frame. For example, the frame includes a sheet that has holes with the same sizes and shapes as the cross sections of the bodies of the pins. For purposes of illustration, it is assumed that the frame has a horizontal top surface made of a horizontal rigid sheet with holes, and that the pins move vertically through the holes. In other embodiments, the movement may be partially or completely horizontal.

The frame 102 includes a vertical movement actuator to move the pins vertically. In some embodiments, the vertical movement actuator is an electromagnetic coil and a magnetized rod inside the coil, which rod moves in response to an electric current through the coil. In some embodiments, the rod contacts one or more pins. In FIG. 1A, the vertical movement actuator is a plate 110 connected to plate mover 112.

The plate mover 112 is a motor to move the plate 110 vertically. For example, the plate mover 112 may be a belt, a chain, an electric motor, an electromagnetic coil or some combination. The plate mover provides enough power to move all the pins in the frame that lie over the plate 110. In the illustrated embodiment, all 126 pins lie above the plate and can be raised vertically by the power provided by plate mover 112. Although shown to one side of the plate in FIG. 1A, the plate mover 112 may be disposed below the plate. For example, the plate mover can comprise one or more electromagnetic coils attached to vertical rods that support the underside of the plate 110. It is within the skill of a practitioner in the art to select one or more coils with sufficient power to lift the plate 110 and to occupy less horizontal area than is occupied by the convex outline of the pins in the frame. The horizontal plane is the plane that is perpendicular to the vertical direction in which the pins are aligned and in which the pins are moved by the plate. More details for sample embodiments of vertical movement actuators are provided in the examples described in subsequent sections.

Associated with each pin 120 in the frame 102 is a lock actuator 130. For example, lock actuator 130a corresponds to pin 120a, lock actuator 130b corresponds to pin 120b, and so on for lock actuators 130c, 130d, 130e, 130f, 130g, 130h, 130i, 130j that are associated with pins 120c, 120d, 120e, 120f, 120g, 120h, 120i, 120j, respectively. When a lock actuator is locked, such as by removing or applying power, the lock actuator contacts the associated pin so as to restrict further vertical movement, up or down. When a lock actuator is unlocked, the lock actuator separates from the associated pin so as to allow further vertical movement. Details for sample embodiments of lock actuators are provided in the examples described in subsequent sections.

FIG. 1A represents a state in which all the lock actuators 130 are unlocked and the movement actuator is in a first position where the plate 110 pushes on all the pins 120 to maintain their positions. The pins 120 extend vertically from the frame, outward toward a user of the tactile display.

2. Method of Operating the Refreshable Topographic Tactile Display.

Figure 2:
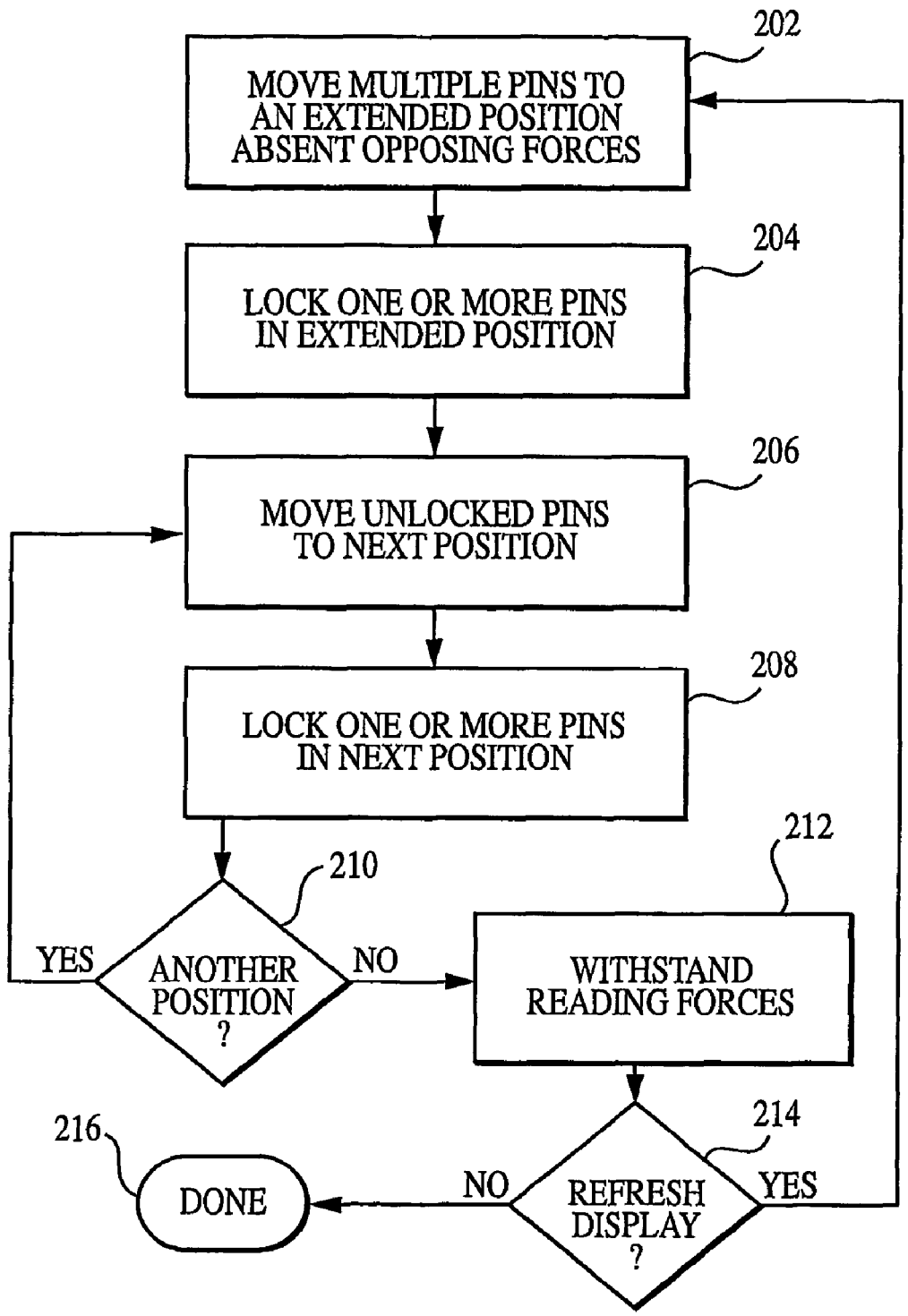
FIG. 2 is a flowchart illustrating a method for operating elements of a tactile device, according to an embodiment.

FIG. 2 is a flowchart illustrating a method for operating elements of a tactile display device. Although depicted in FIG. 2 in a particular order, in other embodiments some steps may be performed in a different order or overlapping in time.

In step 202, all pins are unlocked and moved to the most extended position, as shown in FIG. 1A. In some embodiments, this is performed absent an opposing force by the user. A user pressing down against the pins 120 increases the work that the plate mover 112 must perform to raise the plate 110 to the extended position. For purposes of illustration it is assumed that the weight of 126 pins is two grams (~0.02 Newton) and the pins are raised 0.48 mm in one tenth of a second to be useful as a display. If there is no opposing force, the work to raise the 126 pins is $0.96 \times 10^{-5}$ Newton-meters; and the power required is about 0.1 milliwatts. A movement actuator smaller than the area of a frame (66.2 mm$^2$) is readily designed that delivers this amount of power; and a display having 1000 frames would demand 100 watts for a tenth of a second on refresh. However, if the movement actuator must also work against a 20 gram force (~0.2 Newtons) applied by a user, the power required increases ten-fold. A full display would require 1000 watts for a tenth of a second on refresh.

In some embodiments without an opposing force, described below, each pin has its own movement actuator that is small enough to fit between the bodies of alternate pins.

In some embodiments, the movement actuator is powerful enough to withstand some opposing forces by the user, as the pins are moved to the most extended position. For example, in embodiments in which all 126,000 pins are moved with a single actuator, the average force applied per pin is small even if 20 grams of force is applied by each of several fingers of the user. A movement actuator powerful enough to move 126,000 pins and ten 20-gram forces could be designed to fit within the 66,200 mm$^2$ (662 cm$^2$) area of a 25-row, 40-character display.

In step 204 one or more pins are locked in the extended position using lock actuators corresponding to the pins to be locked. For example, lock actuators 130a, 130b, 130e, 13f are activated to lock pins 120a, 120b, 120e, 120f, respectively, in the extended position. Pins locked in position can withstand forces applied by a user during reading, such as forces as great as 20 grams.

Figure 1B:
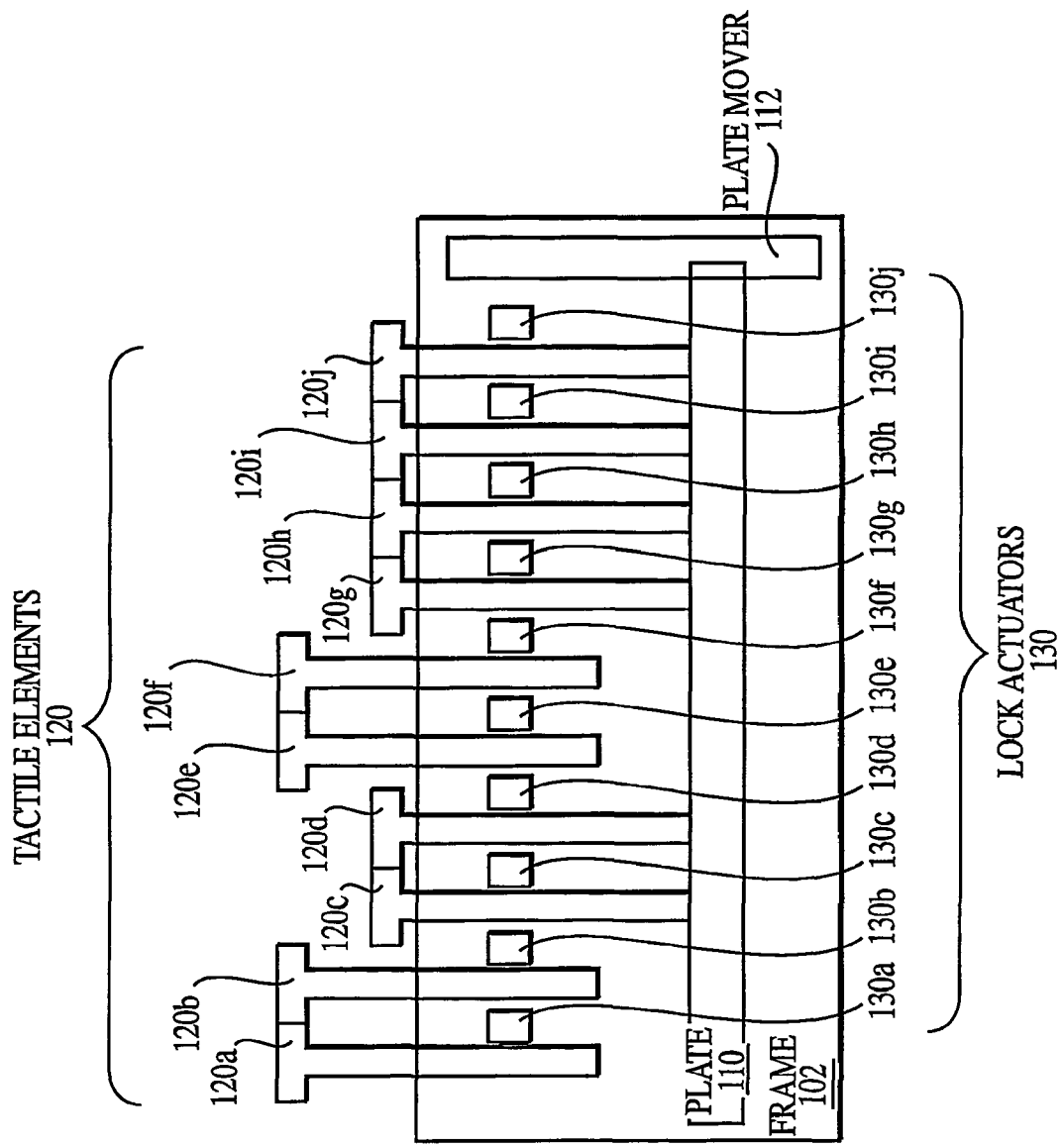
FIG. 1B is a block diagram illustrating a tactile output device with tactile elements in extended and retracted positions, according to an embodiment.

In step 206, the unlocked pins are retracted to the next position using the movement actuator. For example, the plate 110 is lowered to a base position. FIG. 1B is a block diagram illustrating the tactile output device with tactile elements in extended and retracted positions as a result of step 206. As the plate 110 is lowered to a base position, the locked pins 120a, 120b, 120e, 120f remain in the extended position.

The pins can be made to follow the plate using any method. For example, the unlocked pins may follow the plate as a result of the gravitational pull on the individual pins. In several embodiments, described below, the pins contain iron and the plate 110 is magnetized to exert a magnetic pull on the pins as well. The extra pull of a magnetized plate helps offset the effects of friction in causing some pins to stick in the extended position even if not locked. The magnetized plate may also be used in embodiments in which the dimension of movement is not vertical.

When the display is used for topographic information, the next position of the plate as a result of the movement in step 206 may not be the base position, but may be an intermediate position, between the extended position and the base position. This is described in more detail below.

The movement actuator performs very little work to move unlocked pins to the next position. In some embodiments, the movement is performed absent a force applied by a reader, even though the force is in the direction of movement. Such a force may cause some movement actuators to overshoot the next position, especially when used for topographic information. Designing a movement actuator that need not withstand an assisting force is often a simpler task than designing one that should withstand such a force.

In step 208 one or more pins are locked at the next position. For the example depicted in FIG. 1B, lock actuators 130c, 130d, 130g, 130h, 130i, 130j are activated to lock pins 120c, 120d, 120g, 120h, 120i, 120j, respectively, in the base position. For the example depicted in FIG. 1C, lock actuators 130c, 130e are activated to lock pins 120c, 120e, respectively, in a second position. Pins locked in position can withstand forces applied by a user during reading, such as forces as great as 20 grams.

In step 210, it is determined whether there is another position to which the movement actuator should move one or more pins. If so, control returns to step 206 to move the unlocked pins to the next position. If not, then control passes to step 212 where the display is read by a user. During step 212, the locked pins withstand forces applied by a user of the tactile display.

Figure 1C:
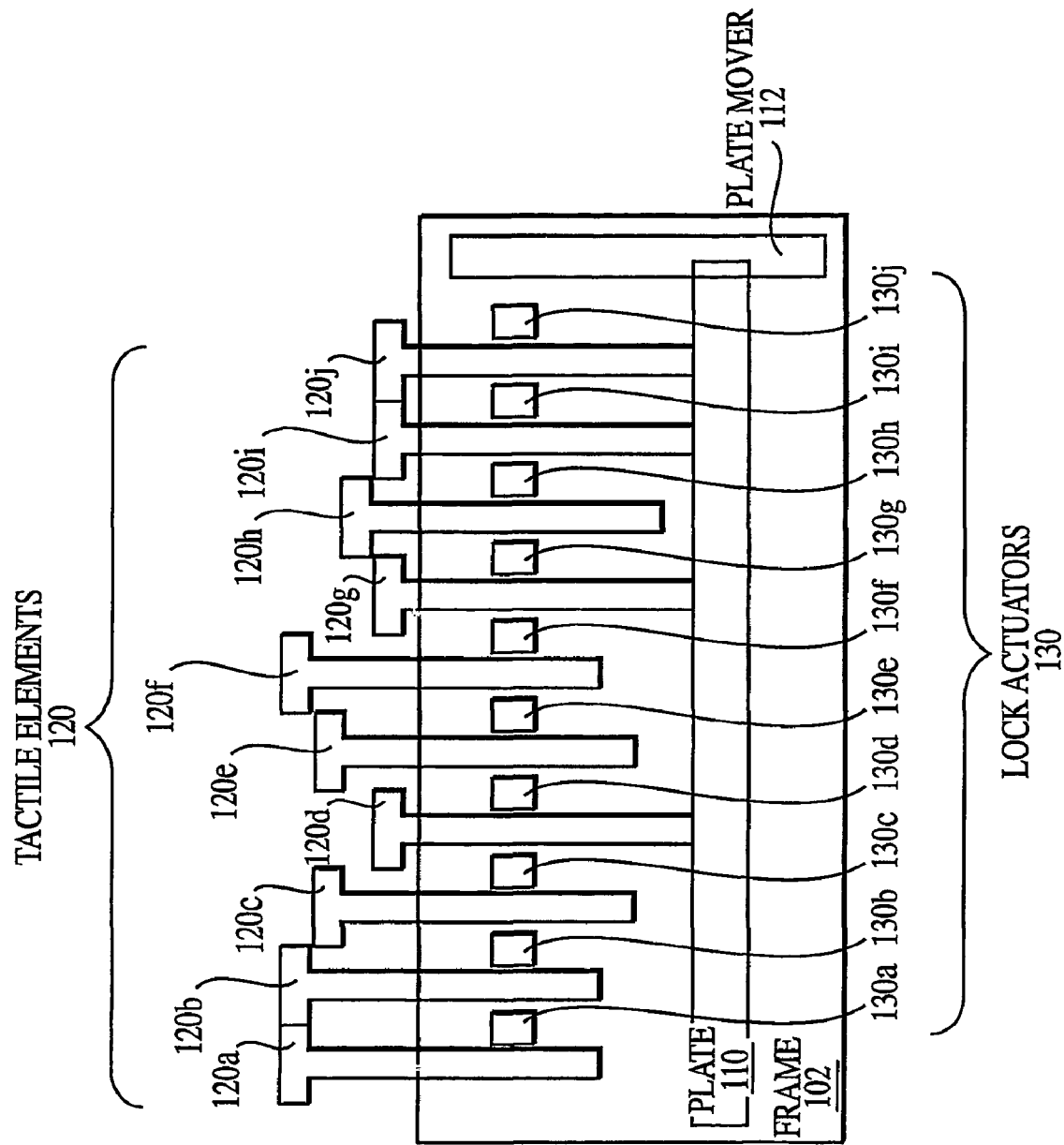
FIG. 1C is a block diagram illustrating a tactile output device with tactile elements in multiple positions, according to an embodiment.

For displaying topographic information, there are multiple positions to which the movement actuator moves the unlocked pins. FIG. 1C is a block diagram illustrating a tactile output device with tactile elements in multiple positions and the plate 110 in a base position. As shown in FIG. 1C, three pins, 120a, 120b, 120f are locked in the most extended position by the corresponding lock actuators 130a, 130b, 130f, respectively. The plate 110 is then retracted to a second position slightly down from the first position but above the base position. At the second position, the pins 120c and 120e are locked by the corresponding lock actuators 130c, 130e. The plate 110 is then retracted to a third position slightly down from the second position and still above the base position. At the third position, the pin 120h is locked by the corresponding lock actuator 130h. The plate 110 is then retracted to the base position where it is located in FIG. 1C. At the base position, the pins 120d, 120g, 120i, 120j are locked by the corresponding lock actuators 130d, 130g, 130i, 130j, respectively.

In step 214 it is determined whether to refresh the display, such as by displaying the next set lines of Braille characters. If not, operation of the display is complete as indicated by passing control to step 216 labeled "done." If it is determined to refresh the display, control passes to step 202 to unlock all the pins and move all the pins to the extended position.

3. Forming Braille Characters with the Refreshable Topographic Tactile Display.

Figure 3A:
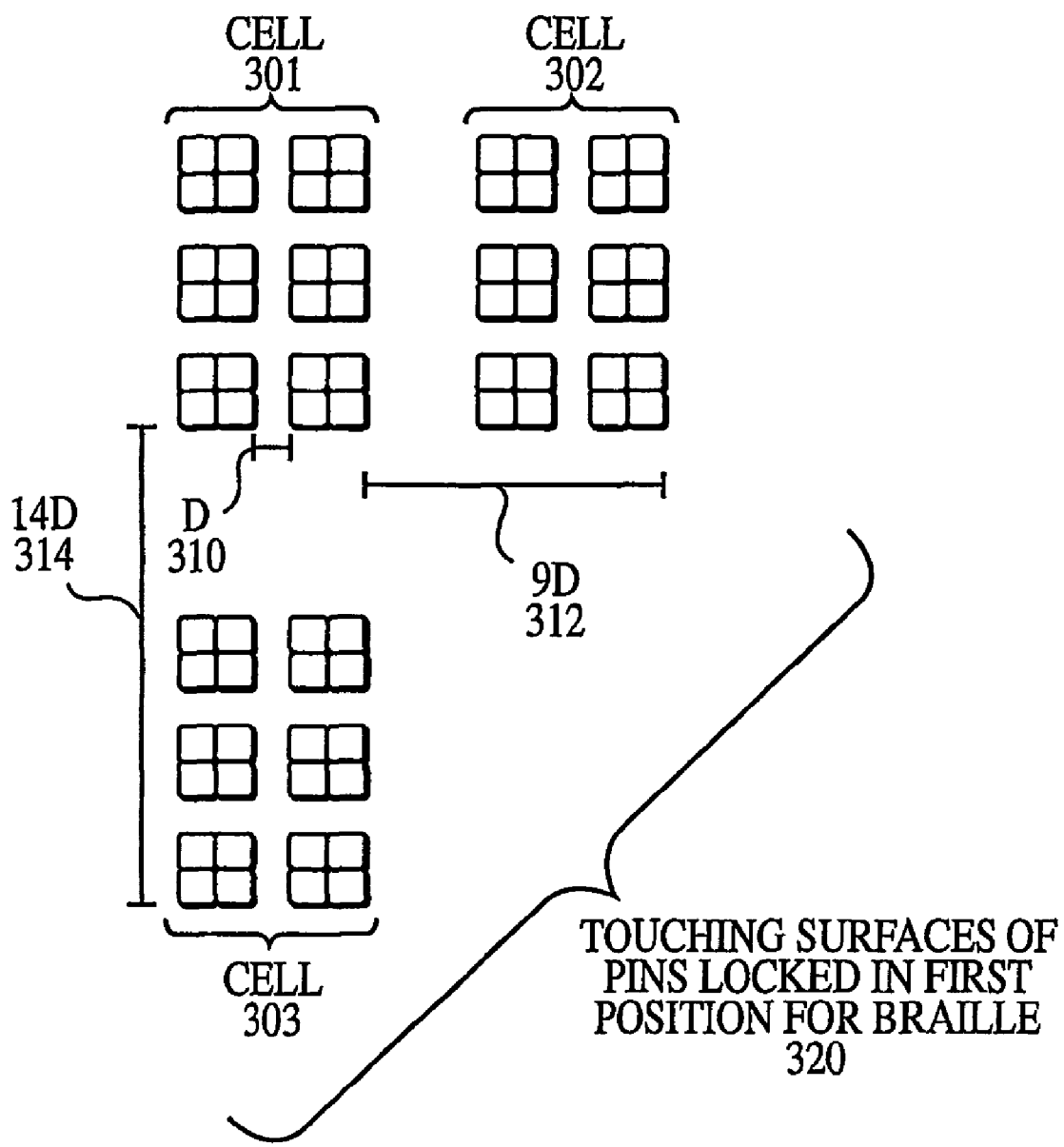
FIG. 3A is a block diagram illustrating a plan view of three Braille cells formed on the tactile output device, according to an embodiment.

FIG. 3A is a block diagram illustrating a plan view of three Braille cells formed on the tactile output device, by locking some pins in the extended position. Each rounded square represents the touching surface 320 of a pin that may be locked in a first position to form a Braille character. Pins not shown are not used in forming any Braille character and are retracted in a base position; the pins in the base position may be locked or unlocked. Each Braille character is formed in a cell on the display. Three cells 301, 302, 303 are shown to illustrate the spacing between characters on the same row of characters and the spacing between different rows of characters. The diameter of a pin head is "D."

According to this embodiment, each pin, in a display made up of contiguous pin heads, has a head diameter, D, of about 0.725 mm—about one half the dot diameter of the Braille specification. Six-dot Braille characters with approximately the correct size dots and with approximately correct spacing between dots can be formed by a cell of 126 pins arranged in nine columns each with 14 pins. Eight-dot extended Braille characters are formed with three additional pins per column, for 153-pin cells of nine columns each with 17 pins. For purposes of illustration, six-dot Braille characters are described below.

A Braille dot is formed by locking four pins with substantively contiguous heads in an array of two columns of two pins each; this dot has a diameter of 2D=1.45 mm, consistent with the Braille specifications. According to these embodiments, the spacing between dots within a Braille character, represented by gap 310, is one pin head diameter D=0.725 mm; this makes the distance between centers of adjacent dots 3D (2.175 mm), within 7% of the Braille specification for 2.34 mm. This gap is considered nearly consistent with the Braille specification. The 7% deviation can be reduced by increasing D a few percent, thus increasing the deviation from the Braille specification for the dot size to a few percent.

According to these embodiments, the spacing between corresponding dots in adjacent Braille characters on the same line, represented by distance 312, is nine pin head diameters, 9D=6.525 mm; this is within 5% of the Braille specification for 6.22 mm. This spacing is considered consistent with the Braille specification. The spacing between corresponding dots in adjacent Braille characters on adjacent lines, represented by distance 314, is 14 pin head diameters, 14D=10.15 mm; this is substantively exact agreement with the Braille specification for 10.16 mm.

4. Forming Graphics with the Refreshable Topographic Tactile Display.

Figure 3B:
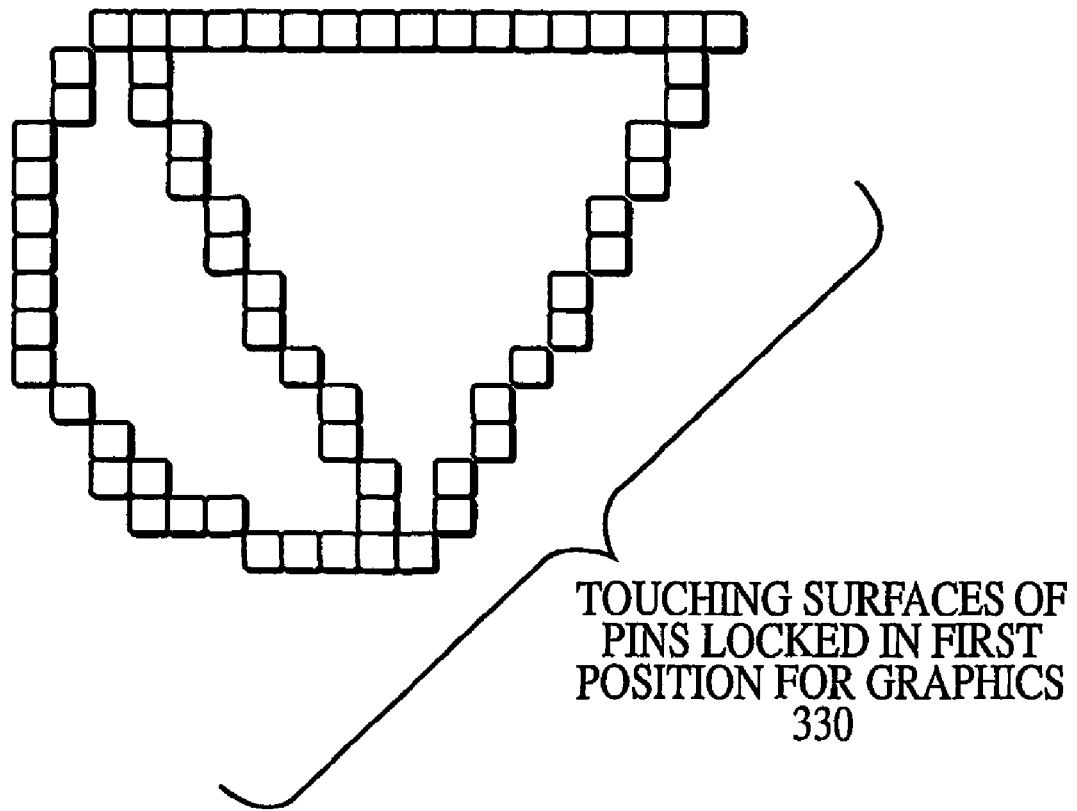
FIG. 3B is a block diagram illustrating a plan view of a graphic formed on the tactile output device, according to an embodiment.

FIG. 3B is a block diagram illustrating a plan view of a graphic formed on the tactile output device. The graphic includes a triangle and an arc connecting two vertices of the triangle. The graphic is presented on the tactile display by the touching surface 330 of pins locked in the extended position. The pins that do not form the graphic are retracted to the base position; and may be locked or unlocked.

5. Topographic Data with the Refreshable Topographic Tactile Display.

Topographic data, such a geographic terrain, is formed by locking each pin representing a location on a map of terrain at a pin position that is above the base position by an amount that is proportional to the height of the terrain at that location on the map. The topographic information is presented on the tactile display by the touching surface of the pins locked at the various positions on or above the base position.

6. Example Locking Actuators.

6.1 Beam and Notch.

Figure 4A:
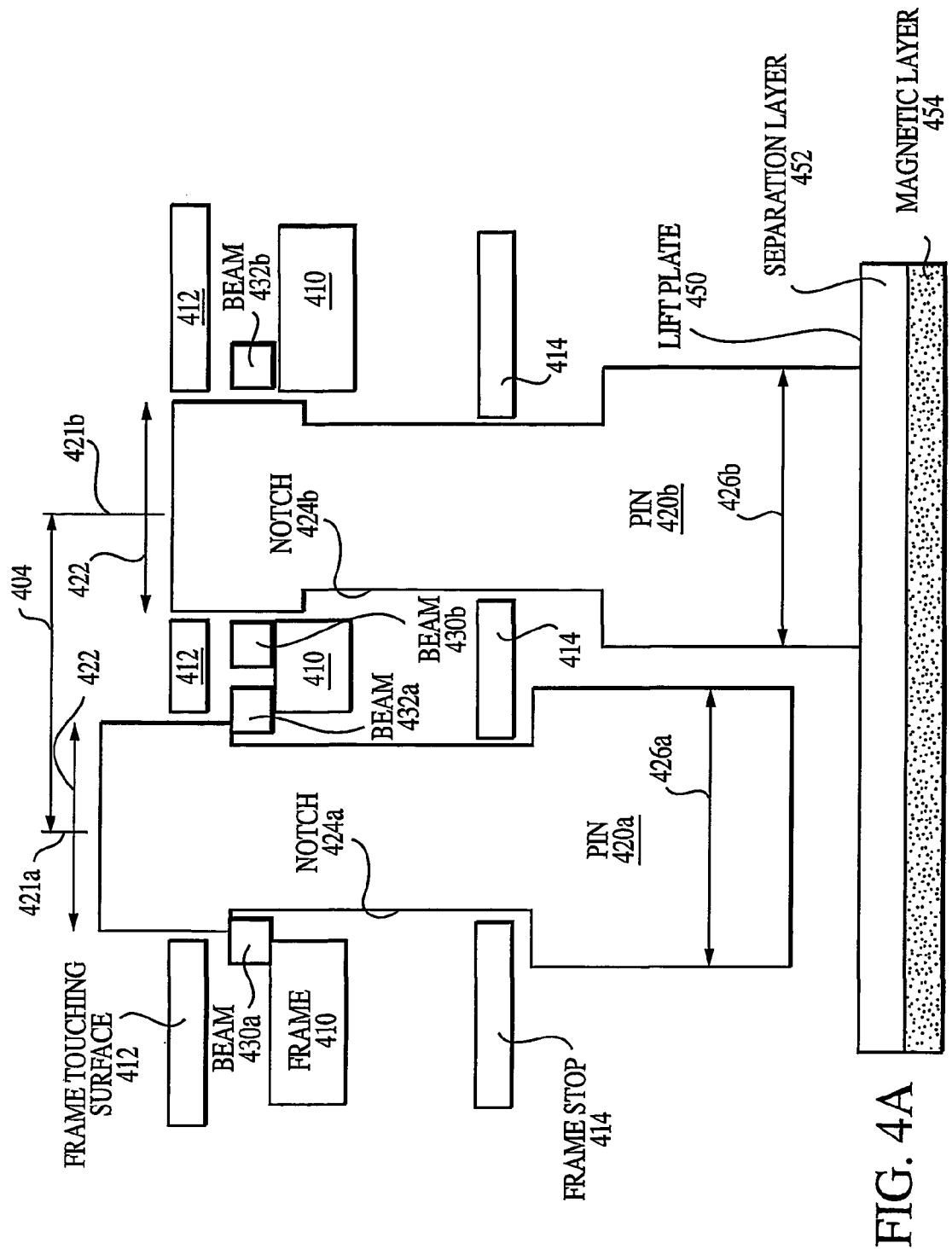
FIG. 4A is a block diagram illustrating a locking actuator that includes a beam and a notch, according to an embodiment.

FIG. 4A is a block diagram illustrating a locking actuator that includes a beam and a notch, according to an embodiment. In this embodiment each pin 420a, 420b includes a notch 424a, 424b. In the illustrated embodiment, the notch 424a, 424b is cut around the circumference of the body of the pins 420a, 420b, respectively. Lines 421a, 421b represent the center axes of the pins 420a, 420b, respectively, when viewed by a user from above.

Pin 420a is locked when a beam 430a moves into notch 424a. The movement of beam 430a is small compared to the movement of pin 420 and can be accomplished with any fine scale motor of low power. In various embodiments, the fine scale motor includes horizontal piezoelectric elements, bimetallic elements, compressed gel elements, and pneumatic elements. In some embodiments a second beam 432a also moves into notch 424a on the opposite side of pin 420a. Once beam 430a or 432a or both is in the notch, the pin 420a does not move down with the plate 450 when the plate moves to a second or base position, and does not move under the force of a user reading the tactile display.

Pin 420b is not locked because beam 430b and beam 432b have not moved into notch 424b. When the plate 450 moves down to the second or base position, the unlocked pin 424b moves down with the plate 450. In the illustrated embodiment, the plate 450 includes a layer 454 of magnetized material and a layer 452 without magnetized material. Layer 452 serves as a magnetic separation layer so that the magnetic force acting on each pin is of a magnitude to pull the pin when unlocked and allow the plate to separate from the pin when the pin is locked.

In the illustrated embodiment, the frame includes an inner frame structure 410, a frame touching surface 412 that can be touched by a user, and a frame stop structure 414. The pins 420a and 420b include, below the notches, a base with a wide base diameter 426a, 426b, respectively. During assembly, the illustrated pins may be inserted into the frame 410 from below, before the plate 450 is inserted. The frame stop 414 prevents the pins 420a, 420b from being pushed out of the frame 410 during movement of the plate 450. The illustrated pins are used to form Braille characters; so the illustrated pins 420a, 420b all have a face diameter 422 and pin center spacing 404 that are consistent with the Braille specifications.

6.2 Piezoelectric Sheet.

Figure 4B:
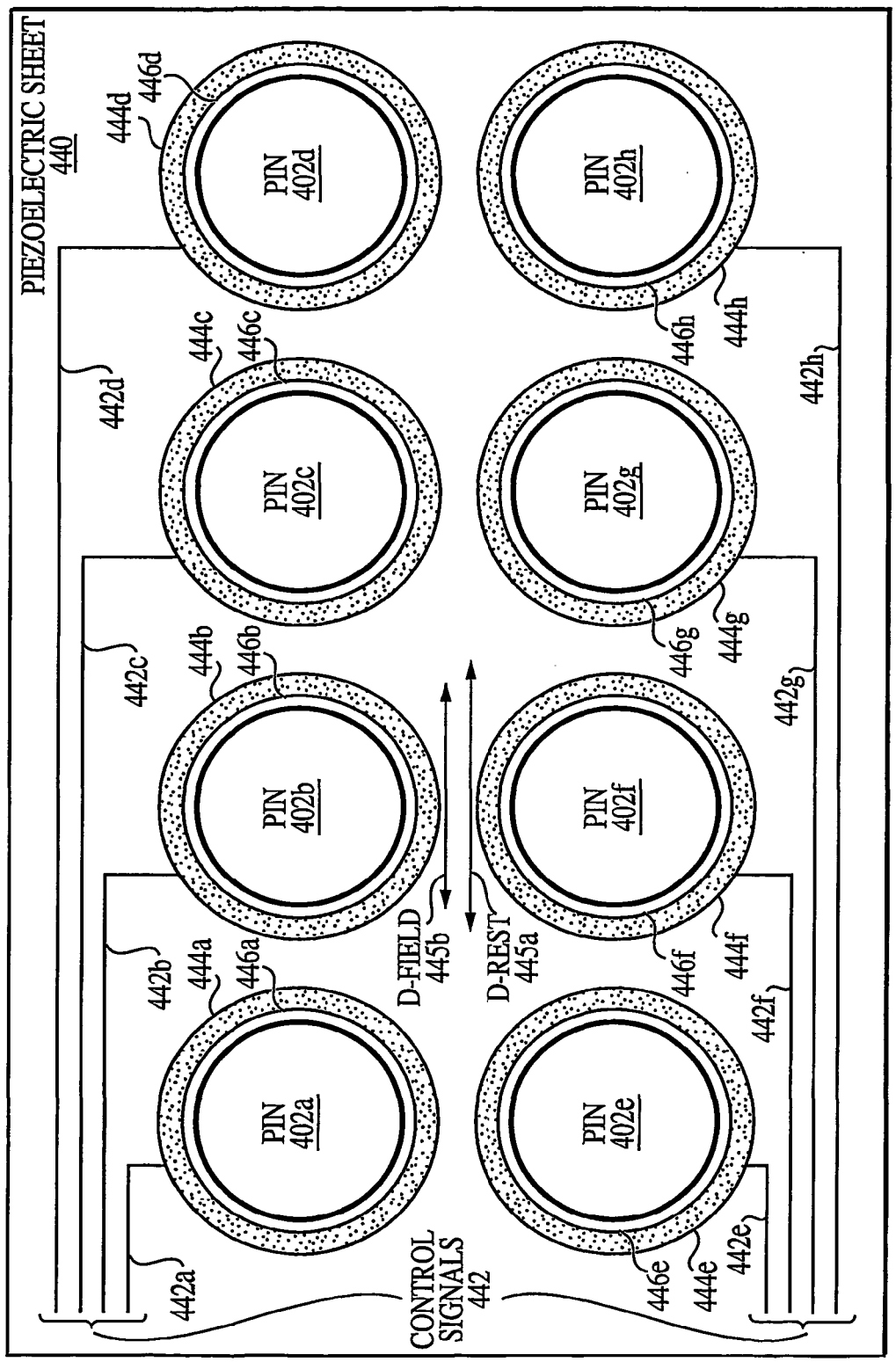
FIG. 4B is a block diagram illustrating a plan view of a locking actuator that includes a piezoelectric sheet, according to an embodiment.

FIG. 4B is a block diagram illustrating a plan view of a locking actuator that includes a piezoelectric sheet 440. The sheet 440 includes openings 444a, 444b, 444c, 444d, 444e, 444f, 444g, 444h of a diameter represented by the distance D-rest 445a. When sheet material in the vicinity of the openings is subjected to an electric field, the openings constrict to smaller openings 446a, 446b, 446c, 446d, 446e, 446f, 446g, 446h with a smaller diameter, represented by the distance D-field 445b.

The sheet is disposed in the frame where the constriction prevents a pin from moving under the force applied by a user. For example, the sheet is placed on or near the frame 410 depicted in FIG. 4A. A plurality of pins 402a, 402b, 402c, 402d, 402e, 402f, 402g, 402h pass through the sheet 440 when the openings have diameter D-rest 445a. FIG. 4B shows the cross section of pin bodies in the plane of the piezoelectric sheet 440.

An electric field is supplied separately to each opening by control signals 442, including control signals 442a, 442b, 442c, 442d, 442e, 442f, 442g, 442h. For example, control signal 442a provides an electric field to the vicinity of opening 444a that causes the opening 444a to constrict to smaller opening 446a with diameter D-field 445b. At the same time, control signal 442b does not provide an electric field to the vicinity of the opening 444b, which therefore does not constrict but maintains its diameter at D-rest 445a.

In some embodiments, the constriction of opening 444a causes the sheet 440 to fill a notch in the pin 402a. In some embodiments the constriction moves a beam that fills the notch in pin 402a as the opening constricts. In some embodiments the constriction causes sufficient friction between the sheet 440 and the pin 402a that the pin does not move under the force of a user while the user reads the display.

6.3 Compression Lock.

Figure 4C:
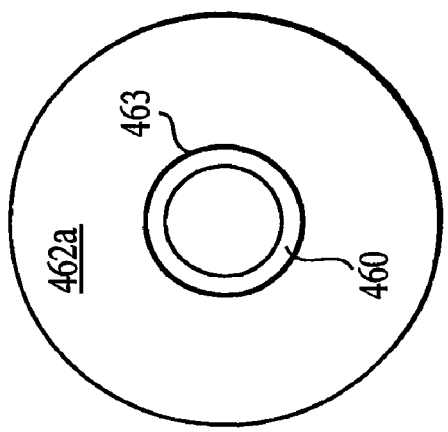
FIG. 4C is a block diagram illustrating a plan view of a locking actuator that includes a compression element that extends inward from an annular plate, according to an embodiment.

FIG. 4C is a block diagram illustrating a plan view of a locking actuator that includes a compression element 460 that extends inward from an annular plate 462a. The plate 462a includes an opening 463 large enough to pass the body of a pin. When not activated, the opening 463 is clear and allows the pin to move freely in the vertical direction. When activated, as illustrated, the compression element 460 moves into the opening 463 and applies sufficient pressure on a sidewall of the pin body to prevent movement of the pin under forces applied by a user during reading. In some embodiments the compression element includes a friction surface to enhance friction between the compression element and the pin; such embodiments are termed herein "friction locks." In some embodiments the compression element simply moves a beam into a notch.

Figure 4E:
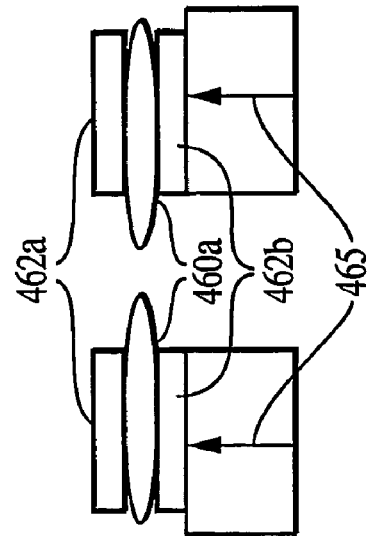
FIG. 4E is a block diagram illustrating a cross-sectional view of a locking actuator that includes a compression element of FIG. 4C in a locked state, according to an embodiment.
Figure 4D:
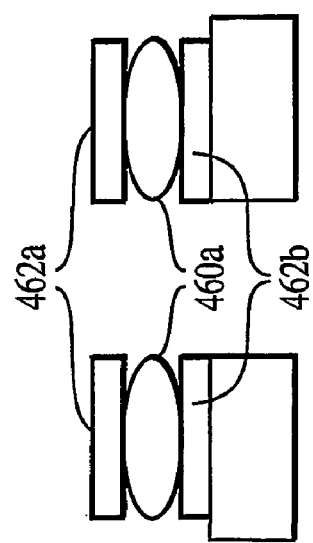
FIG. 4D is a block diagram illustrating a cross-sectional view of a locking actuator that includes a compression element of FIG. 4C in an unlocked state, according to an embodiment.

FIG. 4D is a block diagram illustrating a cross-sectional view of a locking actuator that includes a compression element of FIG. 4C in an unlocked state, according to one embodiment using a gel 460a as the compression element 460. FIG. 4E is a block diagram illustrating a cross-sectional view of the same locking actuator in a locked state. Beneath plate 462a is a gel 460a shaped as an annular ring. Beneath the gel is a second annular plate 462b. Upon activation, an upward force, represented by arrow 465, is applied to lower plate 462b, moving the lower plate upward. For example, a piezoelectric material in lower plate 262b, or in a material below lower plate 262b, is subjected to an electric field strong enough to cause the material to expand or bend upward. In other embodiments a downward force is applied to upper plate 262a, moving the upper plate downward. Under this force, the gel deforms and spreads into the opening in the center of the annular ring where it provides compression against the pin (not shown) disposed in the opening.

Figure 4F:
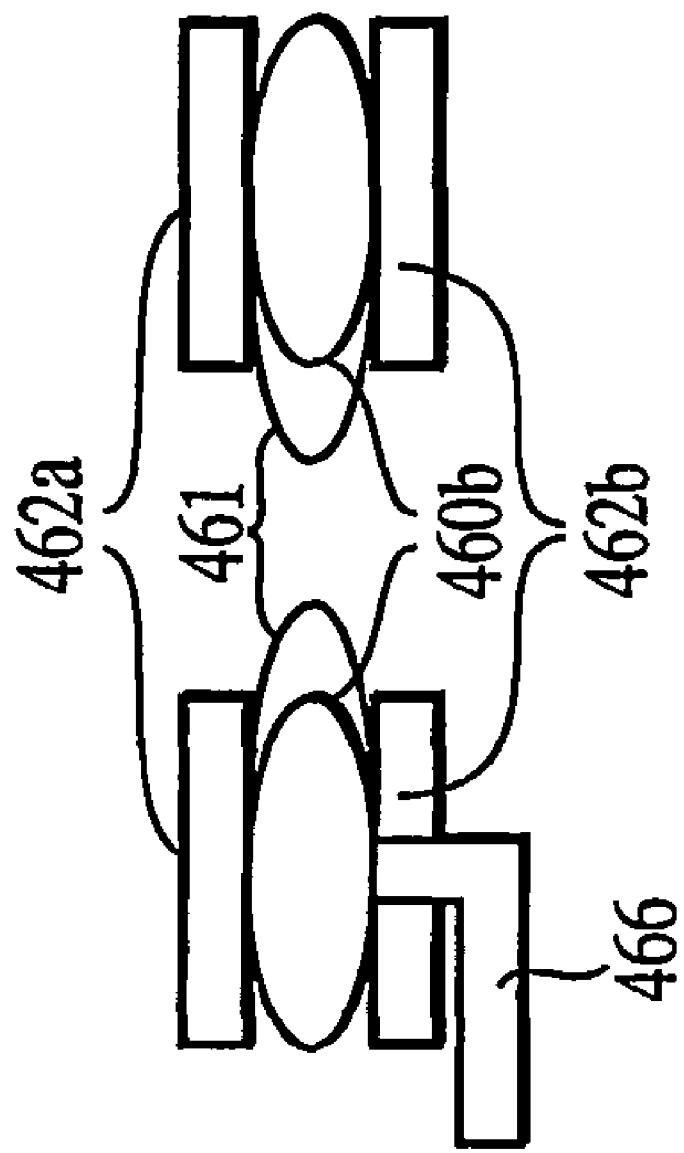
FIG. 4F is a block diagram illustrating a cross-sectional view of a locking actuator that includes a compression element of FIG. 4C with a pneumatic fluid, according to an embodiment.

FIG. 4F is a block diagram illustrating a cross-sectional view of a locking actuator that includes a compression element of FIG. 4C, according to another embodiment using a membrane 460b containing a pneumatic fluid as the compression element 460. Beneath plate 462a is a membrane 460b shaped as an annular ring and connected by nozzle 466 to a reservoir of pneumatic fluid. Beneath the membrane is the second annular plate 462b. Upon activation, the pressure on the fluid in the nozzle 466 is increased. Under this increased pressure, the membrane expands and spreads into the opening in the center of the annular ring where the membrane provides compression against the pin (not shown) disposed in the opening. The expanded shape of the membrane, absent a pin, is indicated in FIG. 4F by the arc 461.

7. Example Tactile Displays.

In the following examples, some modifications and alternatives are presented for features of the pins, the locking actuators, and the movement actuators as particular embodiments of the tactile display. The variations lead to differences in assembly and operation that are apparent to one with skill in the art of tactile displays. The first embodiments described use a lift plate as the movement actuator and may be employed in the presence or absence of an opposing force by the user; the next embodiments use electromagnetic coils as individual movement actuators for each pin when no opposing force is present.

7.1 Lift-plate Movement Actuators.

These embodiments use a lift plate as the movement actuator and may be employed in the presence or absence of an opposing force by the user. Power is conserved by moving pins for a short time and locking pins in place to withstand reading without power being applied to the plate. In embodiments with opposing forces, power is also conserved by averaging the opposing force over a large number of pins moved in unison by the lift plate, so that the opposing force per pin is reduced. To pull unlocked pins downward, these embodiments include a magnetized lift plate 450 with a separation layer 452 and a magnetized layer 454, as described above with reference to FIG. 4A.

7.1.1 Braille Pins with Notch Lock.

The embodiment of FIG. 4A was described above with respect to a bar and notch lock actuator. In that embodiment, Braille pins 420a, 420b are inserted into the frame 410 from below and kept from falling out of the frame by a stop layer 414 in the frame.

7.1.2 Graphic Pins with Notch Lock.

Figure 5A:
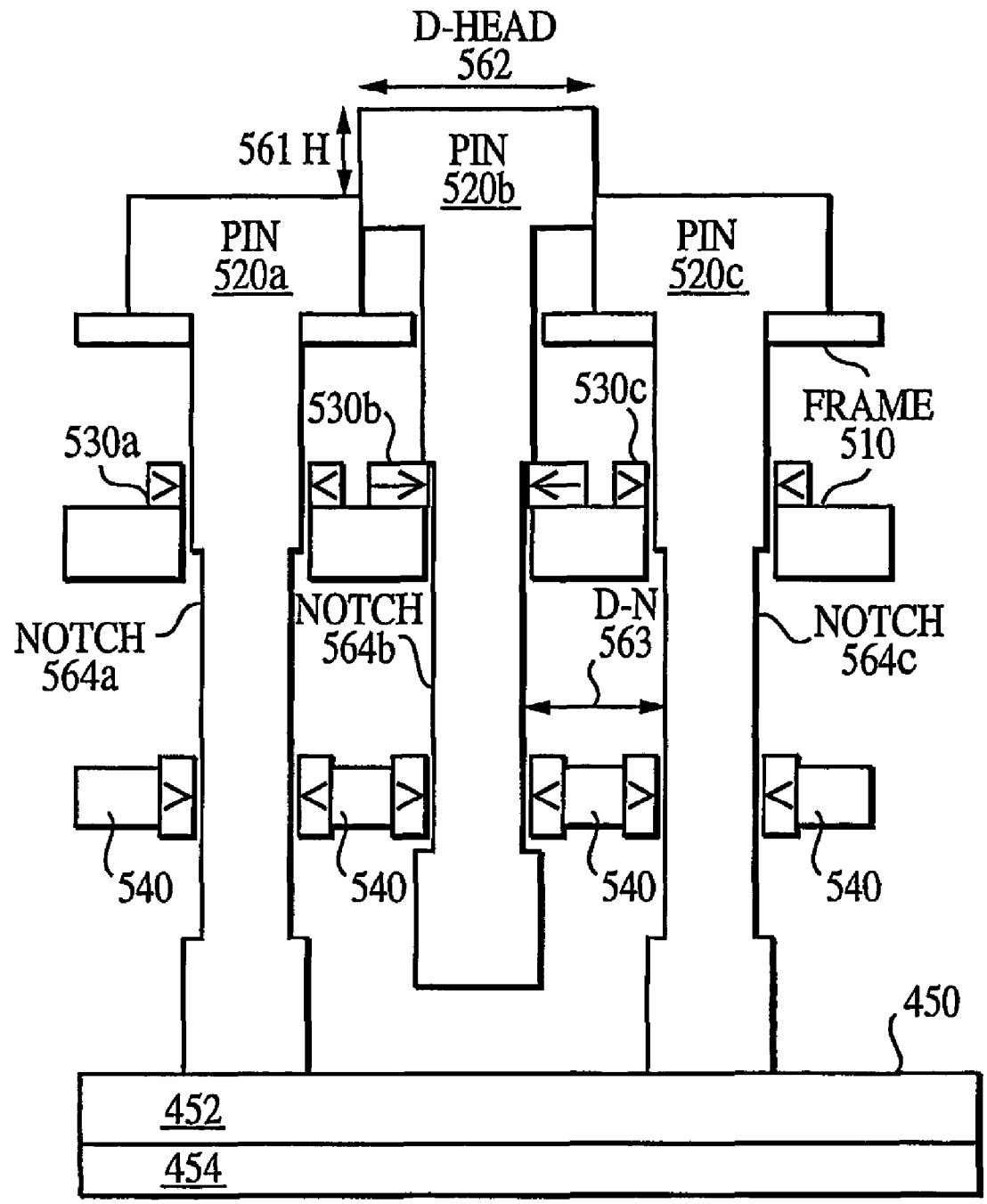
FIG. 5A is a block diagram of a graphics tactile output with an expansion lock for the base of the pins, according to another embodiment.

The beam and notch lock may be used with graphics displays in which graphics are displayed with ridges formed by pins in the extended position. Information is not conveyed by variations in height. FIG. 5A is a block diagram of a graphics tactile output with an expansion lock for the base of the pins, according to another embodiment. In this embodiment, graphics pins 520a, 520b, 520c are used with a head diameter D-head represented by arrow 562 selected so that the head of one pin touches, or nearly touches, the head of an adjacent pin; the pin heads are said to be contiguous. For example, in some embodiments D-head is 0.57 mm. Each pin 520a, 520b, 520c includes a notch 564a, 564b, 564c, respectively, for engaging a beam of a lock actuator.

In this embodiment, the frame 510 includes a locking beam 530a, 530b, 530c for fitting into the notch of a corresponding pin 520a, 520b, 520c. When a particular pin is to be locked in the extended vertical position based on data from a computer process about the graphics to be displayed, the pin, lifted by lift plate 450, is locked by the corresponding beam sliding into the notch. For example, as illustrated, beam 530b extends into notch 564b of pin 520b to lock pin 520b in the extended vertical position. When the lift plate 450 is lowered, pin 520b stands a height H above the adjacent pins. The height H is represented in FIG. 5A by arrow 561. In an example embodiment, H=0.48 mm.

The graphics pins are not inserted into the frame from below, as are the Braille pins. Instead these pins are inserted from above and are kept from falling out by the use of an expansion lock 540. A single expansion lock may be used for all pins in the frame. After the pins are inserted into the frame, the expansion lock 540 expands into the notch on each pin without touching the pin. In the illustrated example, the distance from the inside of one notch to the inside of the next notch is the notch depth D-N, represented by the arrows 563. For example, in some embodiments, D-N is 0.4 mm. The pin can slide vertically into the raised or lowered positions without interference from the base expansion lock 540. However, the pin base below the notch, e.g. below notch 564b of pin 520b, cannot be raised past the expansion lock 540. To remove pins, the expansion lock 540 is opened to withdraw from the notches of the pins, and then the pins may be removed from above. In some embodiments, the expansion lock is implemented with thermal locks that expand at room temperature, and in some embodiment by a compressed gel layer.

7.1.3 Braille Pins with Friction Lock.

Figure 5B:
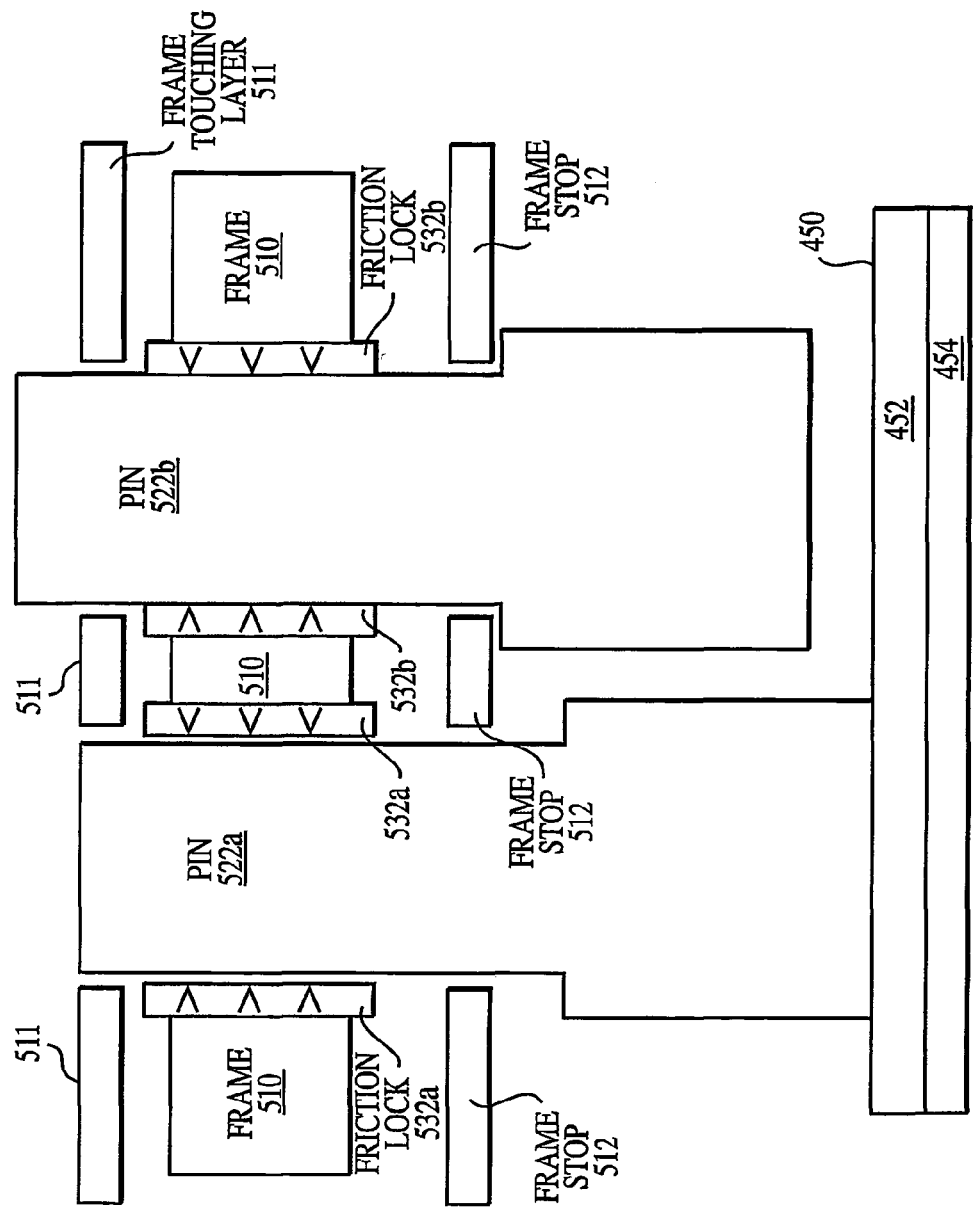
FIG. 5B is a block diagram of a Braille tactile output with a fixed stop for the base of the pins, according to another embodiment.

FIG. 5B is a block diagram of a Braille tactile output with a fixed stop for the base of the pins. In this embodiment a friction lock 532a, 532b is used instead of a beam and notch, in association with individual pins 522a, 522b. This embodiment includes a frame 510 with a touching surface 511. As in FIG. 4A, the frame 510 includes a frame stop layer 512 and a larger base diameter for the pins.

As illustrated, pin 522b is locked in the highest vertical position by corresponding friction lock 532b. When the plate 450 is lowered, only the unlocked pin 522a follows the plate. In some embodiments, the friction lock 532a is then activated to hold pin 522a in place, at the lower vertical position, when a user applies a force during reading. Pin head diameter, spacing between pins, and vertical range are selected to be consistent with Braille specifications.

7.1.4 Topographic Pins with Friction Lock.

Figure 5C:
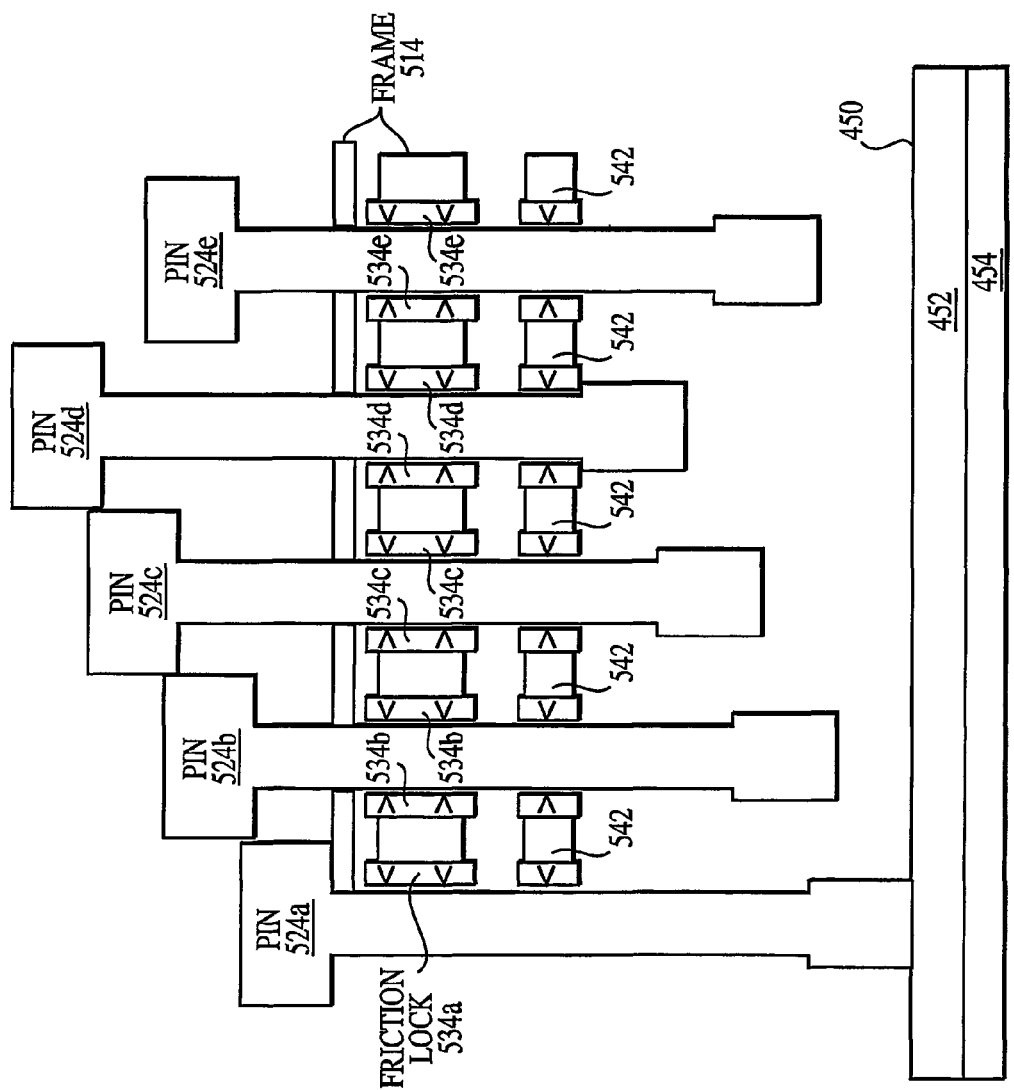
FIG. 5C is a block diagram of a topographic tactile output with an expansion lock for the base of the pins, according to another embodiment.

FIG. 5C is a block diagram of a topographic tactile output with individual friction locks and an expansion lock for the base of the pins. The lifting plate 450, with separation layer 452 and magnetized layer 454, moves multiple graphic pins, including pins 524a, 524b, 524c, 524d, 524e relative to frame 514. The pins each has a large head diameter that provides contiguous heads, and a base diameter that is greater than a diameter of the body of the pin. A base expansion lock 542 expands after the pins are inserted from above, so that the pins cannot be lifted above the fully extended position where the base contacts the base expansion lock. The base expansion lock 542 does not touch the body of the pin and does not retard the vertical movement of the pins between a base position and the fully extended position.

By using friction locks, instead of beams in notches, more continuous vertical positions may be locked. For example, when all the pins are fully extended by the vertical motion of the lift plate 450, one or more pins are locked based on information from a computer processor that indicates the location of the highest point in the terrain represented by the data. The particular pins to be locked are held in their vertical position using individual friction locks corresponding to those pins. For example, pin 524d is locked in the highest position by its friction lock 534d.

The lift plate then drops to the next lower position, and one or more pins are locked at that vertical position with their corresponding individual friction locks. For example, pin 524c is locked in the next position by its corresponding friction lock 534c. Again the lift plate drops and pin 524e is locked by its friction lock 534e. Then, pin 524b is locked in the next lowest position by friction lock 534b. Pin 524a is finally locked by its friction lock 534a; in some embodiments, the pins in the base position are not locked but simply rest on the lift plate in its base position.

7.2 Individual Coil Movement Actuators.

These example embodiments use electromagnetic coils as individual movement actuators for each pin when no opposing force is present. The pins are raised with a low force device to selected heights, and a single locking mechanism may be used to lock all the pins in place.

Figure 6A:
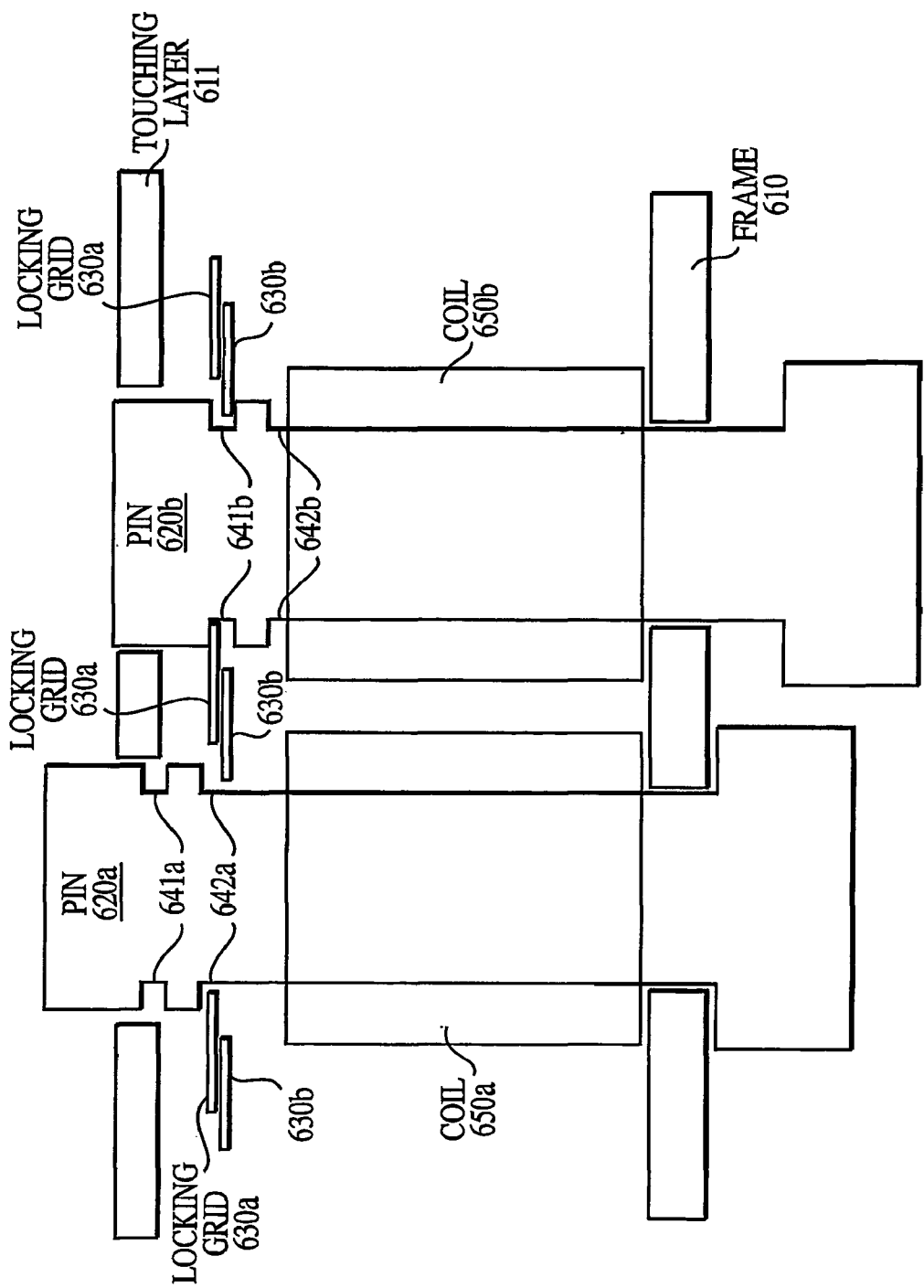
FIG. 6A is a block diagram of a Braille tactile output with individual movement actuators and a locking grid, according to another embodiment.

FIG. 6A is a block diagram of a Braille tactile output with individual movement actuators and a locking grid. The frame 610 includes a touching layer 611 with opening for multiple pins 620a, 620b that are consistent with the spacing for Braille characters. The pins have a head diameter consistent with the specification for Braille dots. On the sidewalls of each pin two notches are cut; for example, pin 620*a* has notches 641*a* and 642*a*, and pin 620*b* has notches 641*b* and 642*b*. The lower notch, 642*a*, 642*b* is used when the pin is locked in the extended position; and the upper notch 641*a*, 641*b* is used when the pin is locked in a retracted position.

Individual coils 650*a*, 650*b* are included for raising each pin to a selected height based on input received from a computer processor. For example, pin 620*a* is raised by coil 650*a* but pin 620*b* is not raised by coil 650*b* to form a particular Braille character indicated by the data received from the computer processor. Because the pins do not withstand a force applied by a user, the coils are low force coils, with fewer windings, that are easier to manufacture and to dispose in the space allotted.

A locking grid includes an upper sheet 630*a* that is moved in one horizontal direction during locking. As depicted in FIG. 6A, in the locked configuration the upper sheet 630*a* of the locking grid is displaced to the right and engages the lower notch 642*a* of the raised pin 620*a* and the upper notch 641*b* of the lowered pin 620*b*. In some embodiments, the locking grid includes a lower sheet 630*b* that is moved in the opposite horizontal direction during locking. As depicted in FIG. 6A, the lower sheet 630*b* of the locking grid is displaced to the left and also engages the lower notch 642*a* of the raised pin 620*a* and the upper notch 641*b* of the retracted pin 620*b*.

Figure 6B:
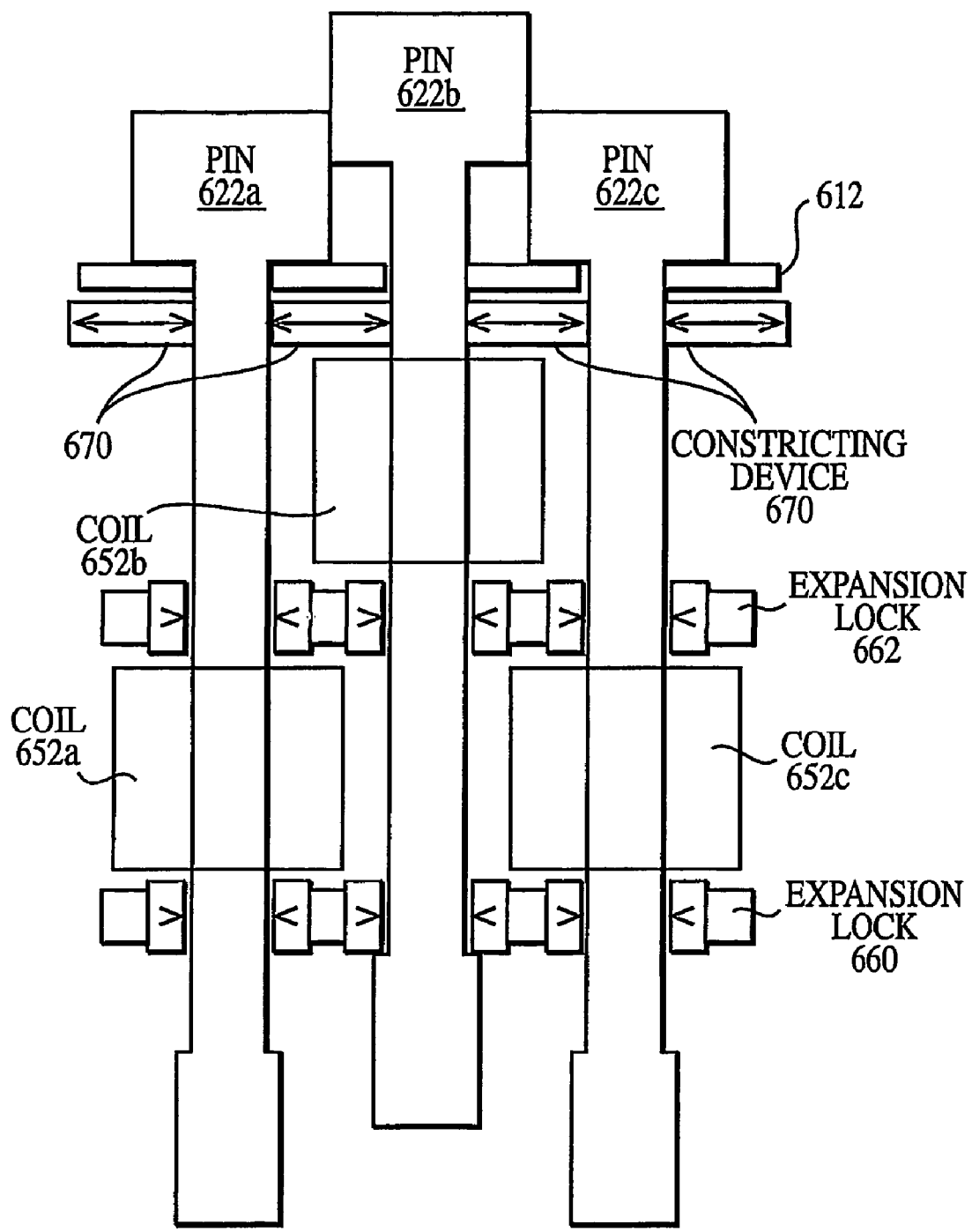
FIG. 6B is a block diagram of a graphics tactile output with individual movement actuators and a constricting lock actuator, according to another embodiment.

FIG. 6B is a block diagram of a graphics tactile output with individual movement actuators and a constricting lock actuator. Because the pins may assume multiple, closely spaced vertical positions, notches are not desirable. Therefore a compression lock, such as a friction lock is used that locks all pins simultaneously. The frame 612 includes openings for multiple pins 622*a*, 622*b*, 622*c* that have head diameters larger than their body diameters so as to produce contiguous pin heads. The pins also have a base diameter larger than the body diameter so that pins inserted vertically from above are kept in place by a base expansion lock 660.

Individual coils 652*a*, 652*b*, 652*c* are included for raising each pin to a selected height based on input received from a computer processor. For example, pin 622*b* is raised by coil 652*b* but pins 622*a*, 622*c* are not raised by coils 652*a*, 652*c*, respectively, to form a particular graphic pattern indicated by the data received from the computer processor. Because the pins do not withstand a force applied by a user, the coils are low force coils, with fewer windings, that are easier to manufacture and to dispose in the space allotted. Because graphics pins are spaced closer together than Braille pins, there is less space for the coils in this graphic display than in FIG. 6A. Additional space per coil is obtained by staggering the vertical position of adjacent coils. For example, coil 652*b* is disposed above coils 652*a* and 652*c*.

A locking mechanism includes an upper sheet 670 that constricts during locking, such as a piezoelectric sheet with multiple holes but a single control signal. As depicted in FIG. 6B, in the locked configuration the upper sheet 670 constricts both to the left and to the right. In some embodiments, the locking mechanism includes a second expansion lock 662 that is engaged only while the pins are subjected to a force from a user during reading.

8. Computer System

Figure 7:
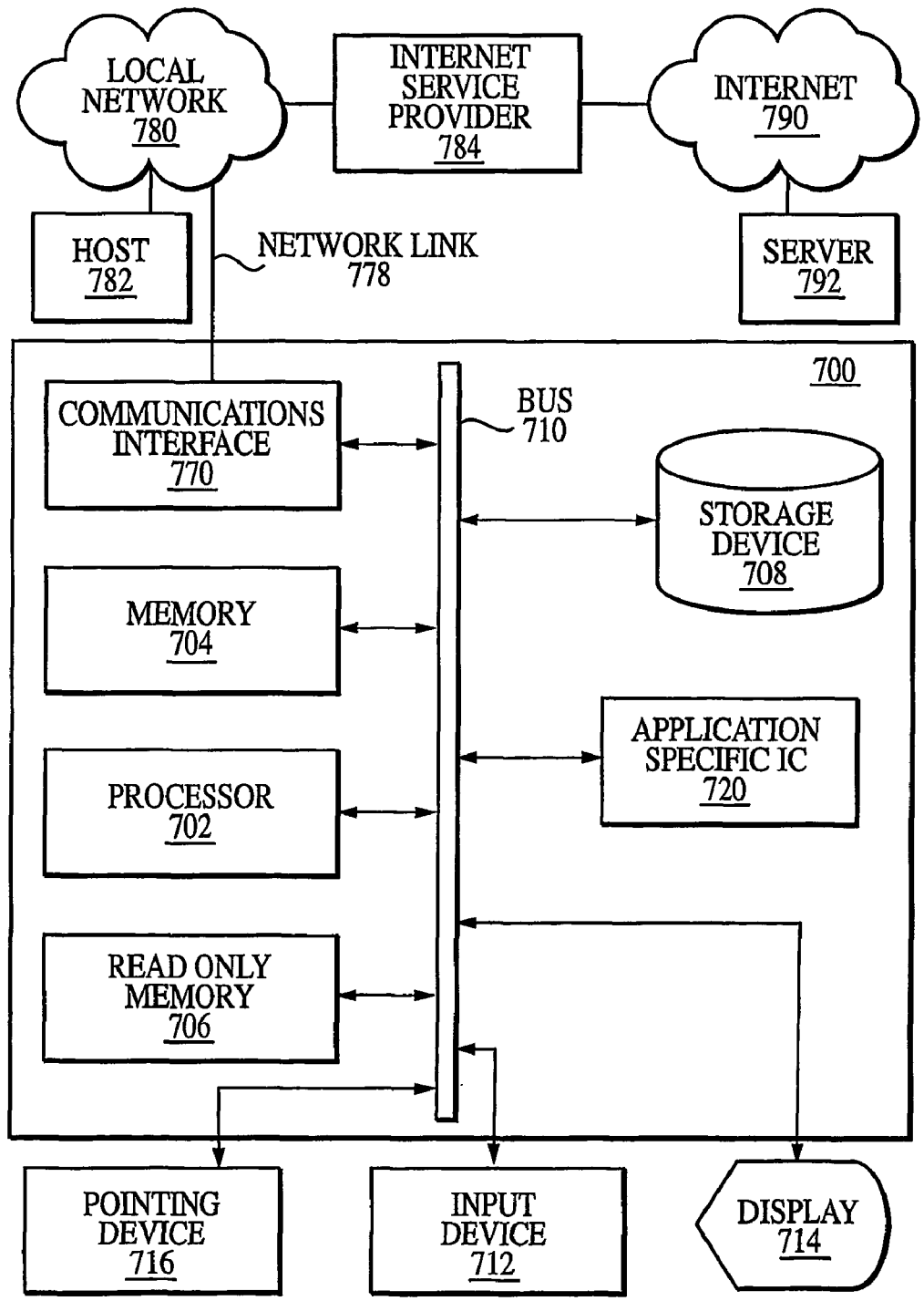
FIG. 7 is a block diagram of a computer system into which the tactile display may be incorporated.

FIG. 7 is a block diagram that illustrates a computer system 700 in which an embodiment of the invention may be included. Computer system 700 includes a communication mechanism such as a bus 710 for passing information between other internal and external components of the computer system 700. Information is represented as physical signals of a measurable phenomenon, typically electric voltages, but including, in other embodiments, such phenomena as magnetic, electromagnetic, pressure, chemical, molecular and atomic interactions. For example, north and south magnetic fields, or a zero and non-zero electric voltage, represent two states (0, 1) of a binary digit (bit). A sequence of binary digits constitutes digital data that is used to represent a number or code for a character. A bus 710 includes many parallel conductors of information so that information is transferred quickly among devices coupled to the bus 710. One or more processors 702 for processing information are coupled with the bus 710. A processor 702 performs a set of operations on information. The set of operations include bringing information in from the bus 710 and placing information on the bus 710. The set of operations also typically include comparing two or more units of information, shifting positions of units of information, and combining two or more units of information, such as by addition or multiplication. A sequence of operations to be executed by the processor 702 constitute computer instructions.

Computer system 700 also includes a memory 704 coupled to bus 710. The memory 704, such as a random access memory (RAM) or other dynamic storage device, stores information including computer instructions. Dynamic memory allows information stored therein to be changed by the computer system 700. RAM allows a unit of information stored at a location called a memory address to be stored and retrieved independently of information at neighboring addresses. The memory 704 is also used by the processor 702 to store temporary values during execution of computer instructions. The computer system 700 also includes a read only memory (ROM) 706 or other static storage device coupled to the bus 710 for storing static information, including instructions, that is not changed by the computer system 700. Also coupled to bus 710 is a non-volatile (persistent) storage device 708, such as a magnetic disk or optical disk, for storing information, including instructions, that persists even when the computer system 700 is turned off or otherwise loses power.

Information, including instructions, is provided to the bus 710 for use by the processor from an external input device 712, such as a keyboard containing alphanumeric keys operated by a human user, or a sensor. A sensor detects conditions in its vicinity and transforms those detections into signals compatible with the signals used to represent information in computer system 700.

A display device 714 is coupled to bus 710 for presenting data arranged in space, such as alphanumeric characters, graphs, and images. Common display devices include a cathode ray tube (CRT) or a liquid crystal display (LCD). Embodiments of the tactile display of the present invention are used along with or in place of the common display devices as display device 714.

Other external devices coupled to bus 710, used primarily for interacting with humans, include a pointing device 716, such as a mouse or a trackball or cursor direction keys, for controlling a position of a small cursor image presented on the display 714 and issuing commands associated with graphical elements presented on the display 714.

In the illustrated embodiment, special purpose hardware, such as an application specific integrated circuit (IC) 720, is coupled to bus 710. The special purpose hardware is configured to perform operations not performed by processor 702 quickly enough for special purposes. Examples of application specific ICs include graphics accelerator cards for generating images for display 714, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 700 also includes one or more instances of a communications interface 770 coupled to bus 710. Communication interface 770 provides a two-way communication coupling to a variety of external devices that operate with their own processors, such as printers, scanners and external disks. In general the coupling is with a network link 778 that is connected to a local network 780 to which a variety of external devices with their own processors are connected. For example, communication interface 770 may be a parallel port or a serial port or a universal serial bus (USB) port on a personal computer. In some embodiments, communications interface 770 is an integrated services digital network (ISDN) card or a digital subscriber line (DSL) card or a telephone modem that provides an information communication connection to a corresponding type of telephone line. In some embodiments, a communication interface 770 is a cable modem that converts signals on bus 710 into signals for a communication connection over a coaxial cable or into optical signals for a communication connection over a fiber optic cable. As another example, communications interface 770 may be a local area network (LAN) card to provide a data communication connection to a compatible LAN, such as Ethernet. Wireless links may also be implemented. For wireless links, the communications interface 770 sends and receives electrical, acoustic or electromagnetic signals, including infrared and optical signals, that carry information streams, such as digital data. Such signals are examples of carrier waves.

The term computer-readable medium is used herein to refer to any medium that participates in providing instructions to processor 702 for execution. Such a medium may take many forms, including, but not limited to, non-volatile media, volatile media and transmission media. Non-volatile media include, for example, optical or magnetic disks, such as storage device 708. Volatile media include, for example, dynamic memory 704. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape, or any other magnetic medium, a compact disk ROM (CD-ROM), or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Network link 778 typically provides information communication through one or more networks to other devices that use or process the information. For example, network link 778 may provide a connection through local network 780 to a host computer 782 or to equipment 784 operated by an Internet Service Provider (ISP). ISP equipment 784 in turn provides data communication services through the public, world-wide packet-switching communication network of networks now commonly referred to as the Internet 790. A computer called a server 792 connected to the Internet provides a service in response to information received over the Internet. For example, server 792 provides information representing video data for presentation at display 714.

The signals transmitted over network link 778 and other networks through communications interface 770, which carry information to and from computer system 700, are exemplary forms of carrier waves. Computer system 700 can send and receive information, including program code, through the networks 780, 790 among others, through network link 778 and communications interface 770.

Various forms of computer readable media may be involved in carrying one or more sequence of instructions or data or both to processor 702 for execution.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing refreshable tactile output of information from a computer, the method comprising the steps of:
    using one movement actuator to move in unison in a vertical direction a plurality of tactile elements that can be touched by a user of the tactile output, wherein each of the tactile elements includes a base, a head spaced from the base in the vertical direction, and a sidewall between the base and the head; and
    locking a particular tactile element of the plurality of tactile elements with a corresponding lock actuator of a corresponding plurality of lock actuators different from the movement actuator based on data received from a computer processor, wherein said locking step includes displacing a displaceable portion of the lock actuator from
        (i) an unlocked position wherein the displaceable portion is spaced apart from the sidewall of the corresponding tactile element, thereby permitting that tactile element to move freely in the vertical direction, to
        (ii) a locked position wherein the displaceable portion is displaced relative to the locked position so as to press against the sidewall of the corresponding tactile element, thereby locking that tactile element in position.

2. A method as recited in claim 1, said step of using the movement actuator performed absent a force applied by the user.

3. A method as recited in claim 1, wherein:
    said step of using the movement actuator further comprises the step of moving in unison the plurality of tactile elements to a first position of a plurality of positions in the vertical direction;
    the method further comprises, after said step of locking the particular tactile element, performing the step of using the movement actuator to move in unison an unlocked subset of tactile elements of the plurality of tactile elements to a second position of the plurality of positions; and
    tactile elements of the unlocked subset are associated with corresponding lock actuators that are not activated during said step of moving the unlocked subset.

4. A method as recited in claim 3, further comprising, after said step of locking the particular tactile element, performing the step of withstanding a force applied to the particular tactile element by the user.

5. A method as recited in claim 3, wherein the particular tactile element locked in the first position extends farther outward toward the user than the unlocked subset of tactile elements in the second position.

6. A method as recited in claim 5, said step of using the movement actuator to move the unlocked subset of tactile elements further comprising moving a plate, which is substantively perpendicular to the vertical direction and which contacts the plurality of tactile elements locked at the first position, along a direction parallel to the vertical direction from the first position to the second position.

7. A method as recited in claim 6, said step of using the movement actuator to move the unlocked subset of tactile elements further comprising relying on gravity, at least in part, to cause the unlocked subset of tactile elements to follow the plate.

8. A method as recited in claim 6, said step of using the movement actuator to move the unlocked subset of tactile elements further comprising relying on magnetic attraction, at least in part, to cause the unlocked subset of tactile elements to follow the plate.

9. A method as recited in claim 3, further comprising, after using the movement actuator to move the unlocked subset of tactile elements, performing the step of locking a second tactile element of the unlocked subset of tactile elements in the second position with a second corresponding lock actuator based on data received from a computer processor.

10. A method as recited in claim 3, wherein a distance between the first position and the second position is consistent with height specifications for Braille characters.

11. A method as recited in claim 3, wherein a distance in a plane approximately perpendicular to the vertical direction across adjacent tactile elements of a locked plurality of tactical elements that are locked in the first position is consistent with a size for a dot in specifications for Braille characters.

12. A method as recited in claim 3, wherein a minimum distance across gaps among a locked plurality of tactile elements that are locked in the first position is consistent with spacing between dots in specifications for Braille characters.

13. A method as recited in claim 3, wherein the plurality of positions in the vertical direction includes a base position and a plurality of positions spaced apart from the base position for representing topographic data.

14. An apparatus for providing refreshable tactile output of information from a computer, comprising:
  a plurality of tactile elements each moveably mounted in a frame so as to move in a vertical direction, each of the tactile elements including a base, a head spaced from the base in the vertical direction, and a sidewall between the base and the head, wherein the plurality of tactile elements can be touched by a user of the tactile output;
  a single movement actuator for moving the plurality of tactile elements in unison relative to the frame in the vertical direction; and
  a plurality of lock actuators different from the movement actuator and corresponding to the plurality of tactile elements, each lock actuator for locking relative to the frame a corresponding tactile element of the plurality of tactile elements,
  wherein each of the lock actuators includes a portion that is displaceable between
    (i) an unlocked position wherein the displaceable portion is spaced apart from the sidewall of the corresponding tactile element, thereby permitting that tactile element to move freely in the vertical direction, and
    (ii) a locked position wherein the displaceable portion is displaced relative to the locked position so as to press against the sidewall of the corresponding tactile element, thereby locking that tactile element in position, and
  wherein each of the lock actuators selectively displaces the displaceable portion between the unlocked and locked positions based on data received from a computer processor.

15. An apparatus recited in claim 14, wherein a cross-sectional area of the movement actuator in a plane substantively perpendicular to the vertical direction is not substantially greater than a touching area on the plurality of tactile elements, which area can be touched by the user.

16. An apparatus recited in claim 14, wherein each tactile element is moved by the movement actuator and locked by a corresponding locking actuator to any position of a plurality of positions in the vertical direction.

17. An apparatus recited in claim 16, wherein the movement actuator moves only unlocked tactile elements of the plurality of tactile elements, which unlocked tactile elements are not locked by corresponding lock actuators of the plurality of lock actuators.

18. An apparatus as recited in claim 16, wherein the plurality of positions includes a base position and a plurality of positions spaced apart from the base position for representing topographic data.

19. An apparatus as recited in claim 18, wherein
  each tactile element of the plurality of tactile elements has an area about half the area specified for a dot in a Braille character on a touching surface that faces the user and that is approximately perpendicular to the vertical direction; and
  touching surfaces of adjacent tactile elements of the plurality of tactile elements at a particular position of the plurality of positions are substantively not spaced apart.

20. An apparatus as recited in claim 18, wherein a distance across an integer multiple of tactile elements of the plurality of tactile elements in a plane approximately perpendicular to the vertical direction is consistent with spacing between adjacent dots in specifications for Braille characters.

21. An apparatus recited in claim 14, wherein the movement actuator further comprises:
  a plate oriented to be substantively perpendicular to the vertical direction; and
  a motive force connected to the plate to move the plate in the vertical direction to each of a plurality of positions relative to the frame.

22. An apparatus recited in claim 21, wherein
  each tactile element of the plurality of tactile elements further comprises material subject to magnetic forces; and
  the plate comprises a magnetized plate to exert an attractive magnetic force.

23. An apparatus as recited in claim 21, wherein the plurality of positions includes a first position and a second position.

24. An apparatus as recited in claim 23, wherein a distance between the first position and the second position is consistent with height specifications for Braille characters.

25. An apparatus as recited in claim 14, each lock actuator of the plurality of lock actuators comprising a compression element that, upon activation, causes compression on the corresponding tactile element that is substantively perpendicular to the vertical direction.

26. An apparatus as recited in claim 14, each lock actuator of the plurality of lock actuators comprising an element that, upon activation, moves perpendicular to the vertical direction into a notch on the corresponding tactile element.

27. An apparatus as recited in claim 14, each lock actuator of the plurality of lock actuators comprising a piezoelectric material.

28. An apparatus as recited in claim 14, each lock actuator of the plurality of lock actuators comprising a gel that changes shape upon activation.

29. An apparatus as recited in claim 14, each lock actuator of the plurality of lock actuators comprising a pneumatic fluid that transfers pressure upon activation.

30. An apparatus as recited in claim 14, wherein a distance between tactile elements of the plurality of tactile elements in a plane substantively perpendicular to the vertical direction is consistent with spacing between adjacent dots in specifications for Braille characters.

31. The apparatus recited in claim 14, wherein:
the displaceable portion of the lock actuator defines an opening through which the sidewall of the corresponding tactile element extends;
wherein when the displaceable portion is in the unlocked position a size of the opening is sufficiently large that the displaceable portion does not press against the sidewall of the corresponding tactile element, thereby permitting that tactile element to move freely in the vertical direction; and
wherein when the displaceable portion is in the locked position the size of the opening is constricted relative to when unlocked so that the displaceable portion presses against the sidewall of the corresponding tactile element, thereby locking that tactile element in position.

32. The apparatus recited in claim 31, wherein the displaceable portion of the lock actuator includes a flexible ring circumscribing the opening.

33. An apparatus as recited in claim 31, wherein the displaceable portion of the lock actuator includes a ring of piezoelectric material circumscribing the opening, wherein an electric field applied to the ring, causes a diameter thereof to constrict so that the ring presses against the sidewall of the corresponding tactile element to lock the tactile element in position.

34. An apparatus as recited in claim 31, each of the plurality of lock actuators comprising:
a compressible ring circumscribing the opening; and
a compression mechanism to compress the ring when the lock actuator is in the locked position and thereby cause a portion of the compressible ring to spread into the opening and press against the tactile element.

35. An apparatus as recited in claim 34, wherein the compression mechanism includes first and second annular rings having the compressible ring sandwiched therebetween and being displaceable relative to each from positions
(i) far apart when the lock actuator is not in the locked position so that the compressible ring is not compressed, and
(ii) close together when the lock actuator is in the locked position so that the compressible ring is compressed.

36. An apparatus as recited in claim 14, wherein the displaceable portion includes a first beam opposite a first portion of the sidewall of the corresponding tactile element, wherein the first beam is displaceable between the locked and unlocked positions so as to be respectively spaced apart from and pressed against the first portion of the sidewall.

37. An apparatus as recited in claim 36, wherein the displaceable portion includes a second beam opposite a second portion of the sidewall, wherein the second beam is displaceable between the locked and unlocked positions so as to be respectively spaced apart from and pressed against the second portion of the sidewall element.

38. An apparatus as recited in claim 14, wherein the sidewall of each of the tactile elements includes a notch configured to engage the displaceable portion of the corresponding lock actuator when the displaceable portion is pressed against the sidewall in the locked position.

39. An apparatus as recited in claim 14, wherein, when the displaceable portion is in the locked position, the displaceable portion is displaced substantially perpendicularly relative to the unlocked position.

40. An apparatus for providing refreshable tactile output of information from a computer, comprising:
a means for moveably mounting in a frame a plurality of tactile elements that can be touched by a user of the tactile output, each of the tactile elements including a base, a head spaced from the base in the vertical direction, and a sidewall between the base and the head;
a means for moving the plurality of tactile elements in unison relative to the frame in a vertical direction; and
a means for locking relative to the frame for withstanding a force applied by the user a tactile element of the plurality of tactile elements based on data received from a computer processor, wherein the means for locking includes
a plurality of lock actuators corresponding to the plurality of tactile elements, each lock actuator for locking relative to the frame a corresponding tactile element of the plurality of tactile elements,
wherein each of the lock actuators includes a portion that is displaceable between
(i) an unlocked position wherein the displaceable portion is spaced apart from the sidewall of the corresponding tactile element, thereby permitting that tactile element to move freely in the vertical direction, and
(ii) a locked position wherein the displaceable portion is displaced relative to the locked position so as to press against the sidewall of the corresponding tactile element, thereby locking that tactile element in position, and
wherein each of the lock actuators selectively displaces the displaceable portion between the unlocked and locked positions based on the data received from the computer processor,
wherein the means for locking is different from the means for moving.

* * * * *